(12) United States Patent
Wang et al.

(10) Patent No.: US 12,145,208 B2
(45) Date of Patent: Nov. 19, 2024

(54) WORM GEAR MACHINE

(71) Applicant: CHONGQING UNIVERSITY, Chongqing (CN)

(72) Inventors: Shilong Wang, Chongqing (CN); Chi Ma, Chongqing (CN); Sibao Wang, Chongqing (CN); Dechao Heng, Chongqing (CN); Lingwan Zeng, Chongqing (CN); Yong Yang, Chongqing (CN); Canhui Yang, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 0 days.

(21) Appl. No.: 17/471,130

(22) Filed: Sep. 9, 2021

(65) Prior Publication Data
US 2022/0324043 A1    Oct. 13, 2022

(30) Foreign Application Priority Data

Apr. 12, 2021  (CN) .......................... 202110391055.X

(51) Int. Cl.
*B23F 11/00*  (2006.01)
*B23F 5/22*  (2006.01)
(Continued)

(52) U.S. Cl.
CPC .............. *B23F 11/00* (2013.01); *B23F 13/02* (2013.01); *B23F 23/1243* (2013.01);
(Continued)

(58) Field of Classification Search
CPC . B23F 13/00–13/06; B23F 11/00; B23F 5/22; B23F 5/24; B23F 23/1243;
(Continued)

(56) References Cited

U.S. PATENT DOCUMENTS

2012/0213602 A1* 8/2012 Winkel ............... B23F 23/1218
409/61

FOREIGN PATENT DOCUMENTS

CN        202560938 U    * 11/2012
CN        203261288 U    * 10/2013
(Continued)

OTHER PUBLICATIONS

Machine translation of CN 105458307 A, which CN '307 was published Apr. 2016.*

(Continued)

*Primary Examiner* — Erica E Cadugan
(74) *Attorney, Agent, or Firm* — Nath, Goldberg & Meyer; Joshua B. Goldberg

(57) ABSTRACT

The present disclosure provides a worm gear machine, including a workbench, a cutter holder and a cutter holder adjusting system, where the cutter holder includes a big bracket, a first slide rail is disposed on the big bracket, a slide seat in sliding fit with the first slide rail is disposed on the first slide rail, a second slide rail is disposed on the slide seat, a small bracket in sliding fit with the second slide rail is disposed on the second slide rail; and a cutter holder spindle is disposed between the big bracket and the slide seat, a cutter bar synchronously rotating with the cutter holder spindle is disposed between an end of the cutter holder spindle facing toward the small bracket and the small bracket, and a gearbox for driving the cutter spindle to rotate is disposed in the big bracket.

5 Claims, 32 Drawing Sheets

(51) Int. Cl.
  *B23F 13/02*   (2006.01)
  *B23F 23/12*   (2006.01)
  *B23Q 1/62*    (2006.01)
(52) U.S. Cl.
  CPC ............... *B23Q 1/626* (2013.01); *B23F 5/22* (2013.01); *B23F 23/1206* (2013.01); *Y10T 409/102067* (2015.01); *Y10T 409/103021* (2015.01); *Y10T 409/10318* (2015.01); *Y10T 409/103657* (2015.01)
(58) Field of Classification Search
  CPC .. B23F 5/20; B23F 13/02; B23F 9/082; Y10T 409/103657; Y10T 409/103021; Y10T 409/10318; Y10T 409/102862; Y10T 409/103498; Y10T 409/107473; Y10T 409/103339; Y10T 409/102703; Y10T 409/102544; Y10T 409/102067; Y10T 409/10159; B23Q 1/626; H02P 5/00; H02P 5/68; H02P 5/74; H02P 6/04; H02P 5/69; H02P 5/695; H02P 5/747; H02P 5/753; H02P 21/00; H02P 21/0003; H02P 21/0089; H02P 21/20; H02P 21/22; H02P 27/00; H02P 27/04; H02P 27/06; H02P 25/00; H02P 25/062; H02P 25/064; H02P 25/022; H02P 25/08; H02P 25/092; H02P 27/08; H02P 27/085; G05B 19/40
  USPC ............ 409/20–21, 1–62; 318/685, 486, 362
  See application file for complete search history.

(56) References Cited

FOREIGN PATENT DOCUMENTS

| | | | |
|---|---|---|---|
| CN | 105458307 A | * | 4/2016 |
| CN | 207358299 U | * | 5/2018 |
| DE | DD-261537 A | * | 11/1988 |

OTHER PUBLICATIONS

Machine translation of Cn 202560938-U, which CN '938 was published Nov. 2012.*
Machine Translation of Cn 207358299-U, which CN '299 was published May 2018.*
Machine Translation of DD 261537 A, which DD '537 was published Nov. 1988.*
Merriam-Webster's Collegiate Dictionary, 10th ed., copyright 1998, p. 485, definition of "generatrix".*
Machine Translation of CN 203261288 U, which CN '288 was published Oct. 2013.*
L. Dębowski, "A flexible DSP/FPGA-based hardware platform for power electronics," Signal Processing Algorithms, Architectures, Arrangements, and Applications SPA 2009, Poznan, Poland, 2009, pp. 30-35.*

* cited by examiner

WORM GEAR MACHINE

CROSS REFERENCE TO RELATED APPLICATION(S)

This patent application claims the benefit and priority of Chinese Patent Application No. 202110391055.X, filed on Apr. 12, 2021, the disclosure of which is incorporated by reference herein in its entirety as part of the present application.

TECHNICAL FIELD

The present disclosure belongs to the technical field of machining devices, and in particular, to a worm gear machine.

BACKGROUND ART

Mechanical drive and transmission are fundamental for equipment manufacturing. The worm gear pair is a key basic component for transferring motions and powers, and also a key core component to ensure the accuracy of gear machine tools, rotary indexing tables and so on. In addition, it is an indication of the equipped level for national industry and defense. While the high-accuracy static indexing can be ensured with a circular grating and an encoder over high-accuracy closed-loop control of the worm gear pair, the dynamic accuracy must still reply on a high-accuracy indexing worm gear. The high-accuracy indexing worm gear is widely applied to accuracy machine tools, large astronomical telescopes, missile interception devices, radar devices and other high-end devices, and is decisive for their performance and core competitiveness. The accuracy of the indexing worm gear has a direct impact on the accuracy for transferring a motion, the stability and the uniformity for distributing a load. The higher accuracy of the indexing worm gear results in the higher accuracy for transferring the motion, the higher mechanical efficiency, the better wear resistance, the longer fatigue life, the smaller mechanical vibration and the smaller noise. The accuracy of the indexing worm gear part mainly depends on the machining accuracy of a worm gear machine, the accuracy of a cutter, the process methods, materials, environmental stability and so on, among which the machining accuracy of the worm gear machine is the most critical factor to affect the accuracy of the worm gear.

Due to the complex enveloping motions, the heat generation at the cutting interface is significant during the hobbing and shaving processes. The thermal error accounts for 70% or more of the total machining error. The machining error generated by the multi-axis linkage is untraceable, and the high-accuracy worm gear machining typically uses a trial-and-error trimming method to compensate a comprehensive error, that is, it obtains measured tooth profile and alignment errors by comparing a trial cut tooth surface with a designed tooth surface, and accordingly shapes the worm gear cutter reversely, and sets the trajectory of the machine tool reversely for re-machining; and with repeated iterative machining, the accuracy of the tooth surface meets the designed requirements. The comprehensive error control method is hard to improve the accuracy of machining and shaping and has the extremely low efficiency. Presently, for the lack of controllable shape-quality machining processes and tools of the high-accuracy worm gear, it is cumbersome to machine the worm gear at the high accuracy and high efficiency, and to ensure the service performance of the worm gear.

SUMMARY

In view of this, an objective of the present disclosure is to provide a worm gear machine, to meet requirements of machining the worm gear at the high accuracy and high efficiency.

To achieve the above-mentioned objective, the present disclosure provides the following technical solutions:

A worm gear machine includes a workbench for clamping a worm gear workpiece, a cutter holder for clamping a cutter and a cutter holder adjusting system for adjusting a position of the cutter holder relative to the workbench, where the cutter holder includes a big bracket, a first slide rail is disposed on the big bracket, a slide seat in sliding fit with the first slide rail is disposed on the first slide rail, a second slide rail is disposed on the slide seat, a small bracket in sliding fit with the second slide rail is disposed on the second slide rail, and the first slide rail and the second slide rail are parallel to each other, and a cutter holder spindle is disposed between the big bracket and the slide seat, a cutter bar synchronously rotating with the cutter holder spindle is disposed between an end of the cutter holder spindle facing toward the small bracket and the small bracket, and a gearbox for driving the cutter spindle to rotate is disposed in the big bracket; and a first hydrostatic bearing mechanism is disposed between the slide seat and the cutter holder spindle, and a second hydrostatic bearing mechanism is disposed between the cutter bar and the small bracket.

Further, the first hydrostatic bearing mechanism may include a first shaft sleeve sleeved to the cutter holder spindle, and a first hydrostatic oil chamber may be provided between the first shaft sleeve and the cutter holder spindle.

Further, an inner hole of the first shaft sleeve may be a conical hole, a conical section cooperated with the first shaft sleeve may be provided on the cutter holder spindle, and the conical hole and the conical section may have the same conicity; and a first mounting portion for mounting the cutter holder spindle may be disposed on the slide seat, and the first shaft sleeve and a side of the first mounting portion may be in limiting fit and may be provided therebetween with a first adjusting washer for adjusting an axial position of the first shaft sleeve relative to the conical section to adjust a fit clearance between the first shaft sleeve and the conical section.

Further, a positioning plate sleeved to the cutter holder spindle may be fixedly mounted on the other side of the first mounting portion, and a thrust bearing for bearing an axial force may be disposed on two sides of the positioning plate; and a first shaft shoulder positioned between the conical section and the positioning plate may be disposed on the cutter holder spindle, a side of the positioning plate away from the first shaft sleeve may be provided with a limit sleeve sleeved to the cutter holder spindle, and a side of the limit sleeve away from the positioning plate may be provided with a spindle nut in threaded fit with the cutter holder spindle, where one thrust bearing is disposed between the positioning plate and the first shaft shoulder, and the other thrust bearing is disposed between the positioning plate and the limit sleeve.

Further, the second hydrostatic bearing mechanism may include a sleeve sleeved to the cutter bar in sliding fit and synchronously rotating with the cutter bar, a second shaft sleeve may be sleeved to the sleeve, and a second hydrostatic oil chamber may be provided between the second shaft sleeve and the sleeve.

Further, an outer wall of the second shaft sleeve may be a conical surface, a conical through hole fitting with the conical surface may be provided on the small bracket, and the conical surface and the conical through hole may have the same conicity; and an expansion seam may be provided on the second shaft sleeve along a longitudinal direction of the second shaft sleeve, and a clearance adjusting mechanism for adjusting an axial position of the second shaft sleeve relative to the conical through hole to adjust a fit clearance between the second shaft sleeve and the sleeve may be disposed on the small bracket.

Further, a deformation groove may further be annularly and uniformly distributed on an outer sidewall of the second shaft sleeve, the deformation groove may be arranged along the longitudinal direction of the second shaft sleeve, and a metal rubber elastomer for driving the second shaft sleeve to deform adaptively may be disposed in the deformation groove; and an oil groove may further be provided on an inner wall of the second shaft sleeve, an oil hole interconnected with an outer wall of the second shaft sleeve may be provided in the oil groove, and an annular oil groove corresponding to the oil hole may be provided on an inner wall of the conical through hole.

Further, a first rotating shaft parallel to the cutter holder spindle may be disposed in the gearbox, a first gear and a second gear that respectively and synchronously rotate with the cutter holder spindle may be arranged on the cutter holder spindle, a third gear simultaneously engaged with the first gear and the second gear may be disposed on the first rotating shaft, and a difference in the number of teeth between the first gear and the second gear may have an absolute value of 1.

Further, a transmission gear shaft may be sleeved to the cutter holder spindle, and both the first gear and the second gear may synchronously rotate with the transmission gear shaft; and one end of the transmission gear shaft may be provided with a connecting disc fixedly connected to the transmission gear shaft, the connecting disc may be provided as at least two lobes, and a flat key fitting with the cutter holder spindle may be disposed between two adjacent lobes of connecting discs.

Further, a cylindrical roller bearing for bearing a radial force may be disposed between a box body of the gearbox and the transmission gear shaft.

Further, the workbench may include a housing, a workbench body may be disposed on the housing, a mandrel and a worm and worm gear mechanism for driving the mandrel to rotate may be arranged in the housing of the workbench, and the workbench body may synchronously rotate with the mandrel;

the worm and worm gear mechanism may include an indexing worm and a damping worm parallel to each other in axis, same ends of the indexing worm and the damping worm may be respectively provided with a first engagement gear and a second engagement gear engaged with each other, a transmission ratio of the first engagement gear to the second engagement gear may be equal to 1, and the indexing worm and the damping worm may have the same helix angle but opposite rotation directions; and a mandrel sleeve synchronously rotating with the mandrel may be sleeved to the mandrel, an indexing worm gear engaged with the indexing worm and a damping worm gear engaged with the damping worm may be arranged on the mandrel sleeve, the indexing worm may be transmissively connected to a power component, and a micro-motion component for driving the damping worm to slightly move along an axial direction thereof to ensure zero-clearance engagement between the damping worm and the damping worm gear may be disposed on the damping worm.

Further, an axial hydrostatic guide rail and a radial hydrostatic guide rail may be arranged between the housing and the mandrel; the axial hydrostatic guide rail may be coaxial with the mandrel and disposed on an upper end surface of the mandrel, and an annular groove for avoiding the axial hydrostatic guide rail may be provided on an undersurface of the workbench body; the radial hydrostatic guide rail may be coaxial with the mandrel and sleeved to the mandrel; and a hydraulic oil passage for providing hydraulic oil between the axial hydrostatic guide rail and a fitting surface of the mandrel as well as between the radial hydrostatic guide rail and the fitting surface of the mandrel to form a hydraulic oil film may be provided in the housing.

Further, the cutter holder adjusting system may include a base, an X-direction guide rail and a pedestal in sliding fit with the X-direction guide rail may be arranged on the base, a Y-direction guide rail perpendicular to the X-direction guide rail and a cutter holder seat in sliding fit with the Y-direction guide rail may be arranged on the pedestal, a Z-direction guide rail may be disposed on the cutter holder seat, and the Z-direction guide rail may simultaneously be perpendicular to the X-direction guide rail and the Y-direction guide rail; and the big bracket may be mounted on the Z-direction guide rail in sliding fit.

The present disclosure has the following beneficial effects:

By providing the workbench and the cutter holder, the worm gear machine provided by the present disclosure adjusts a position of the cutter holder relative to the workbench by use of the cutter holder adjusting system, thereby machining the worm gear workpiece on the workbench with the cutter on the cutter holder. Specifically, by providing the cutter holder as the big bracket, the slide seat and the small bracket that are mutually in sliding fit, mounting the cutter holder spindle between the big bracket and the slide seat, and mounting the cutter bar between the cutter holder spindle and the small bracket, the present disclosure can conveniently drive an axial motion between the cutter holder spindle and the cutter bar to change the cutter; and by providing the first hydrostatic bearing mechanism between the slide seat and the cutter holder spindle, and the second hydrostatic bearing mechanism between the cutter bar and the small bracket, the present disclosure can improve the rigidity and transmission accuracy of the cutter holder spindle and the cutter bar, to meet the requirements of machining the worm gear at the high accuracy and high efficiency.

The worm gear machine provided by the present disclosure can perform serial and diverse machining by mounting cutters of different tooth profiles on the cutter bar to obtain high-accuracy worm gears of different tooth profiles, and has the better universality. It can meet the requirements of precisely and serially machining worm gears of different tooth profiles such as involute worm gears, straight sided normal worm gears, and Archimedes worm gears.

BRIEF DESCRIPTION OF THE DRAWINGS

In order to make the objectives, technical solutions and beneficial effects of the present disclosure clearer, the present disclosure provides the following drawings:

FIG. 17*a* is a response diagram of conventional sampling current vector control; and FIG. 17*b* is a response diagram of sampling hardware current vector control.

FIG. 21*a* is a curve graph of an acceleration process of a 3.7 Kw spindle motor to 24,000 rpm (800 Hz); and FIG. 21*b* is a curve graph of a deceleration process of a 3.7 Kw spindle motor from 24,000 rpm to 0 (800 Hz).

FIG. 29 is a speed closed-loop frequency response of a servo system before and after parameter optimization.

REFERENCE NUMERALS

100—workbench, 101—housing, 102—workbench body, 103—mandrel, 104—indexing worm, 105—damping worm, 106—first engagement gear, 107—second engagement gear, 108—mandrel sleeve, 109—indexing worm gear, 110—damping worm gear, 111—axial hydrostatic guide rail, 112—radial hydrostatic guide rail, 113—annular groove, 114—hydraulic oil passage, 115—workbench motor, 116—micro-motion component, 117—through hole, 118—base, 119—connecting seat, and 120—high-accuracy circular grating;

200—cutter holder, 201—big bracket, 202—first slide rail, 203—slide seat, 203*a*—first mounting portion, 204—second slide rail, 205—small bracket, 206—cutter holder spindle, 207—cutter bar, and 208—gearbox;

210—first shaft sleeve, 211—first adjusting washer, 212—positioning plate, 213—thrust bearing, 214—limit sleeve, 215—spindle nut, 216—sealing ring, 217—sealing sleeve, and 218—sealing ring;

220—sleeve, 221—second shaft sleeve, 222—expansion seam, 223—deformation groove, 224—oil groove, 225—oil hole, 226—annular oil groove, 227—cover plate, 228—clearance adjusting washer, 229—adjusting washer, 246—sealing ring, 247—limit clamp ring, 248—metal rubber elastomer, 249—conical hole, and 250—connecting rod;

230—first rotating shaft, 231—first gear, 232—second gear, 233—third gear, 234—transmission gear shaft, 235—connecting disc, 236—flat key, 237—cylindrical roller bearing, 238—baffle, 239—second rotating shaft, 240—third rotating shaft, 241—fourth gear, 242—fifth gear, 243—sixth gear, 244—seventh gear, and 245—power motor; and

300—base, 301—X-direction guide rail, 302—pedestal, 303—Y-direction guide rail, 304—cutter holder seat, 305—Z-direction guide rail, 306—servo motor, 307—servo motor, and 308—servo motor.

DETAILED DESCRIPTION OF THE EMBODIMENTS

The present disclosure will be further described in combination with accompanying drawings and specific embodiments so as to enable those skilled in the art to better understand and practice the disclosure, but the illustrated embodiments do not constitute any limitation to the present disclosure.

Figure 1:
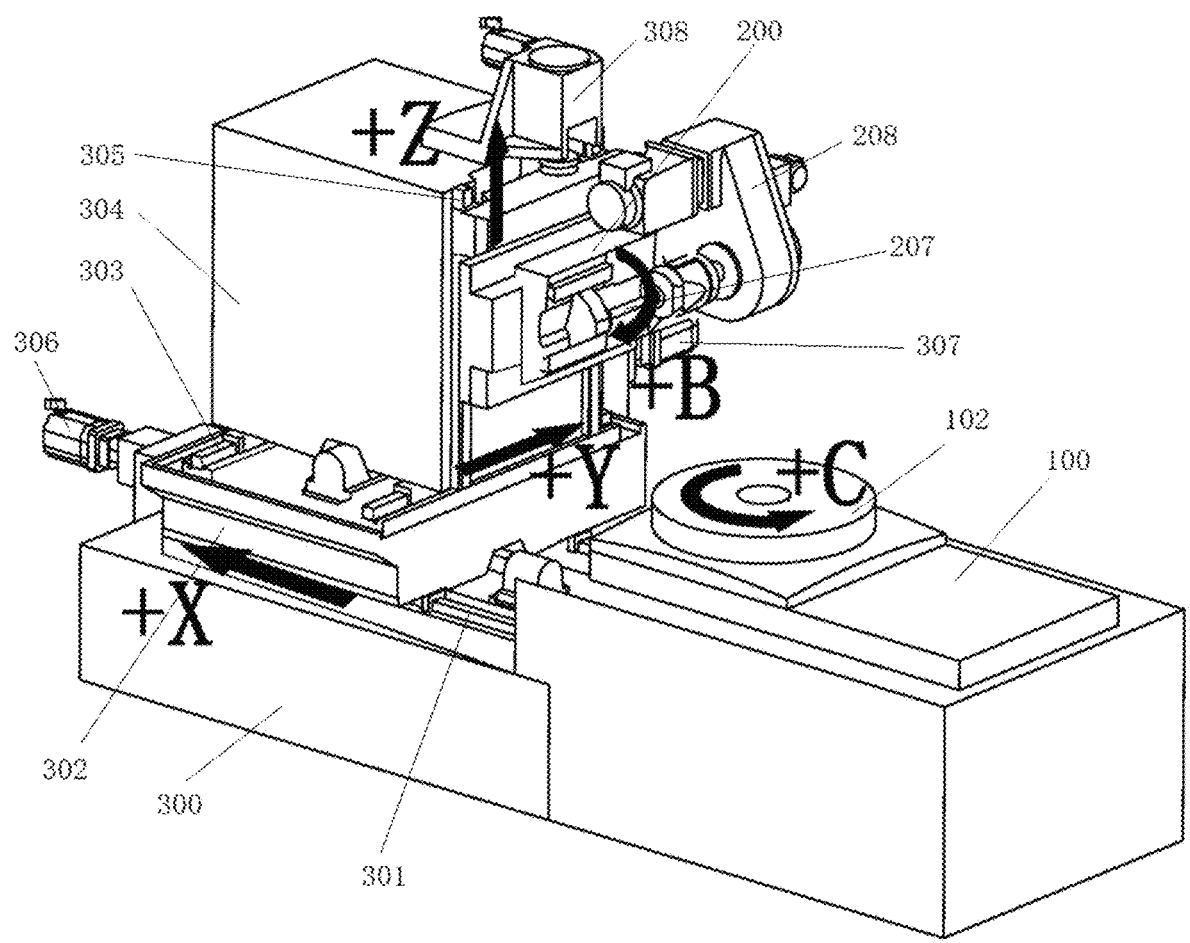
FIG. 1 is a schematic structural view of an embodiment of a worm gear machine according to the present disclosure.
Figure 2:
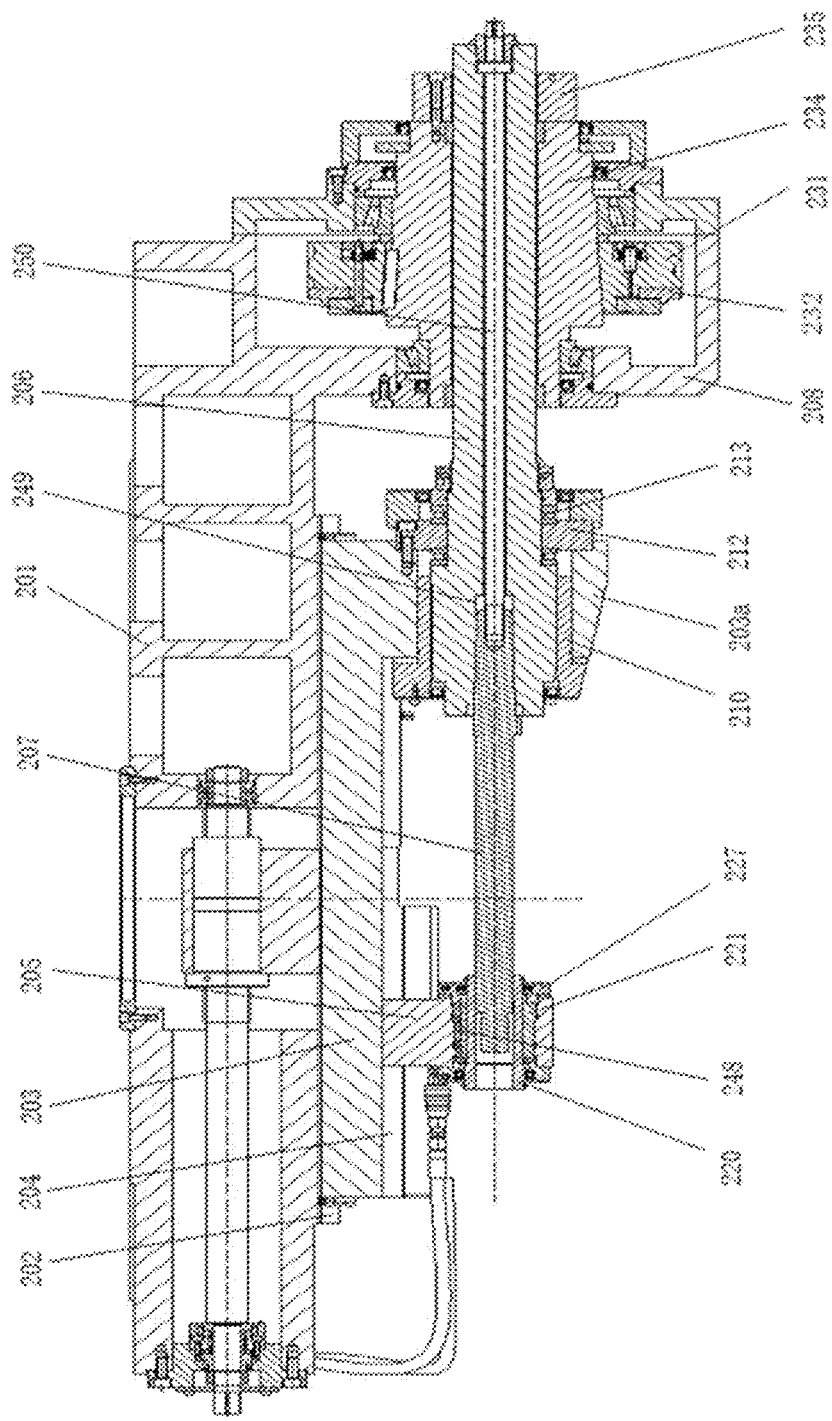
FIG. 2 is a schematic structural view of a cutter holder.
Figure 3:
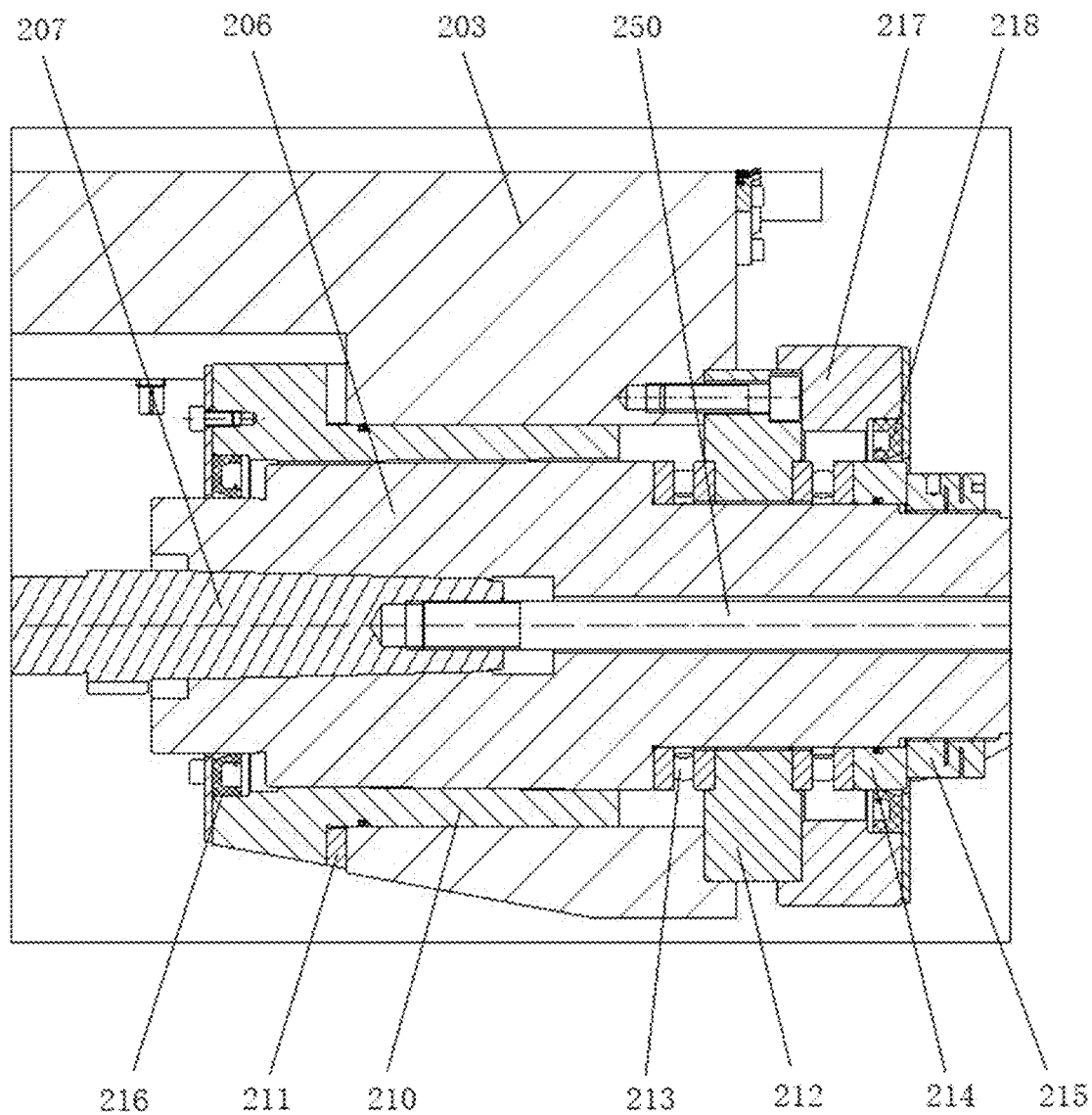
FIG. 3 is a schematic structural view of a first hydrostatic bearing mechanism.
Figure 4:
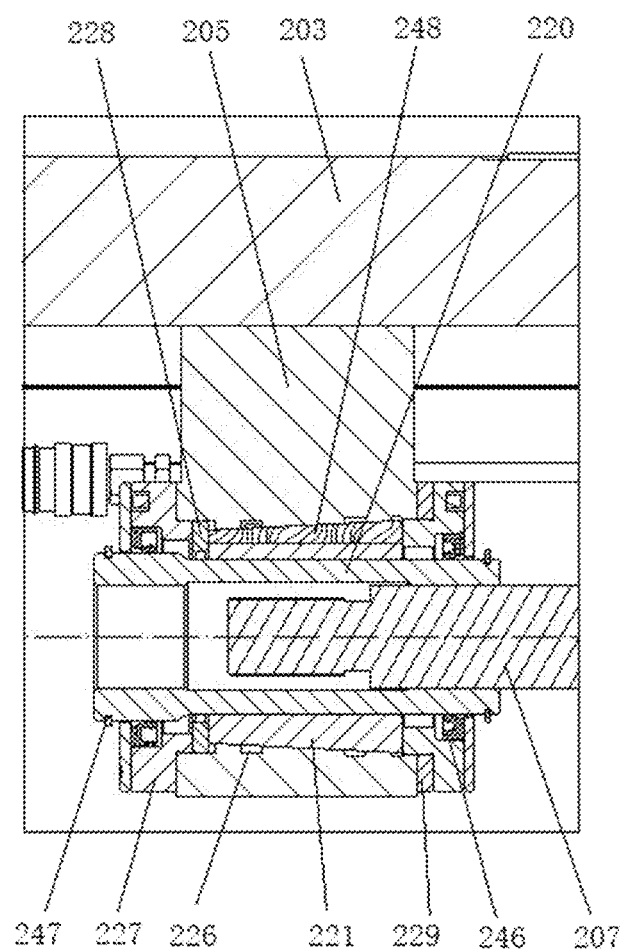
FIG. 4 is a schematic structural view of a second hydrostatic bearing mechanism.
Figure 5:
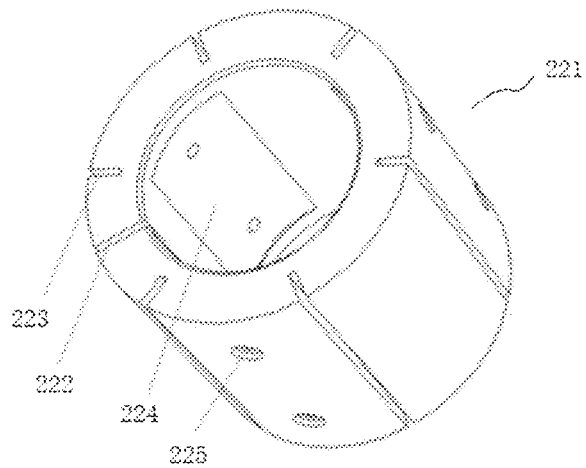
FIG. 5 is a schematic structural view of a second shaft sleeve.
Figure 6:
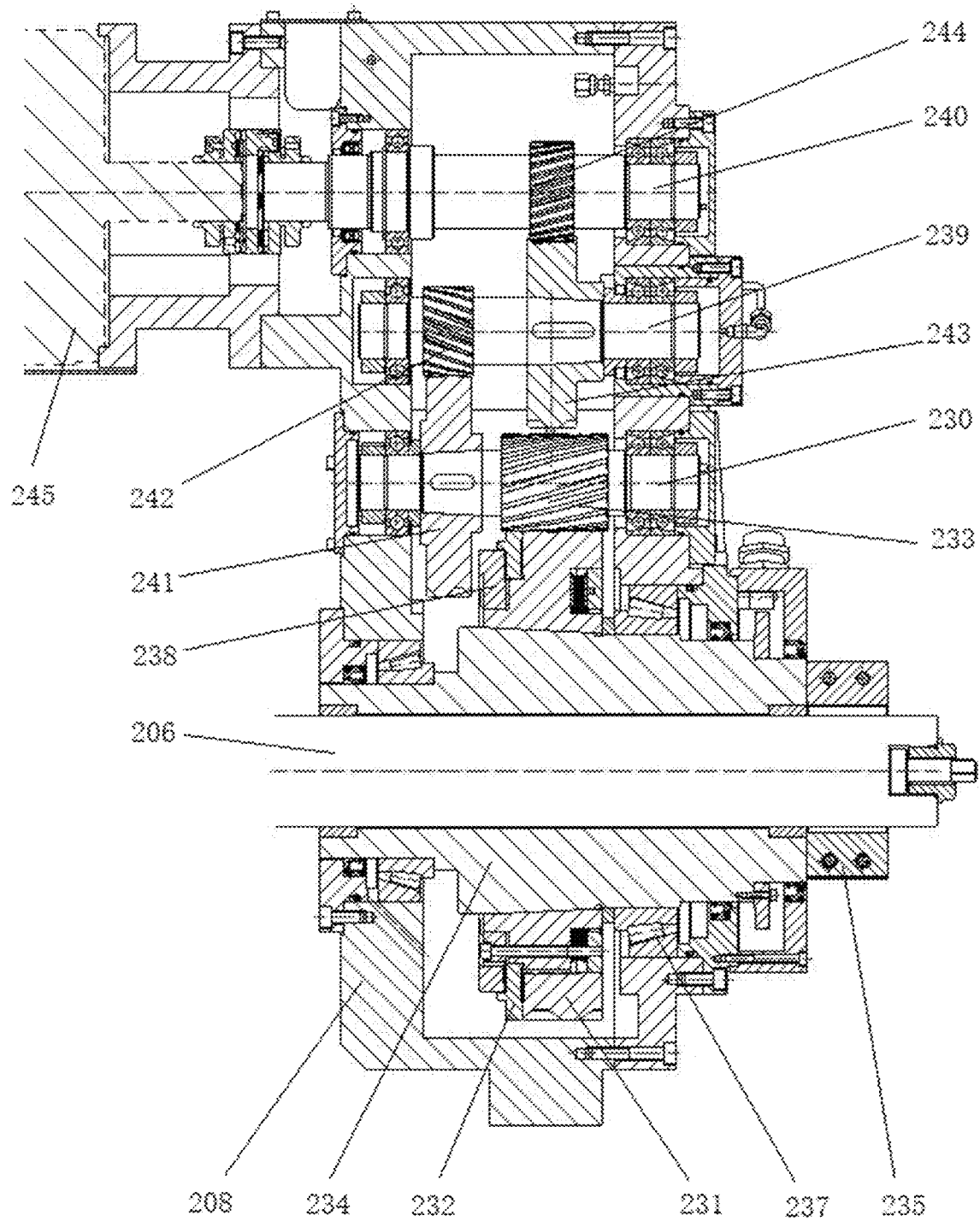
FIG. 6 is a schematic structural view of a gearbox.
Figure 7:
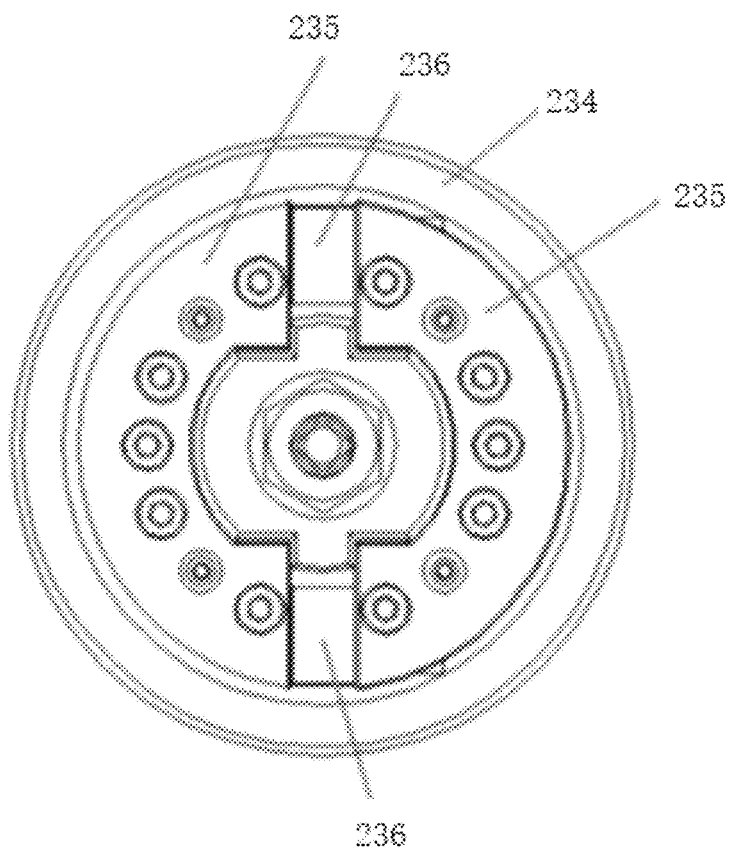
FIG. 7 is a schematic view of a connection relation among a connecting disc, a transmission gear shaft and a cutter holder spindle.
Figure 8:
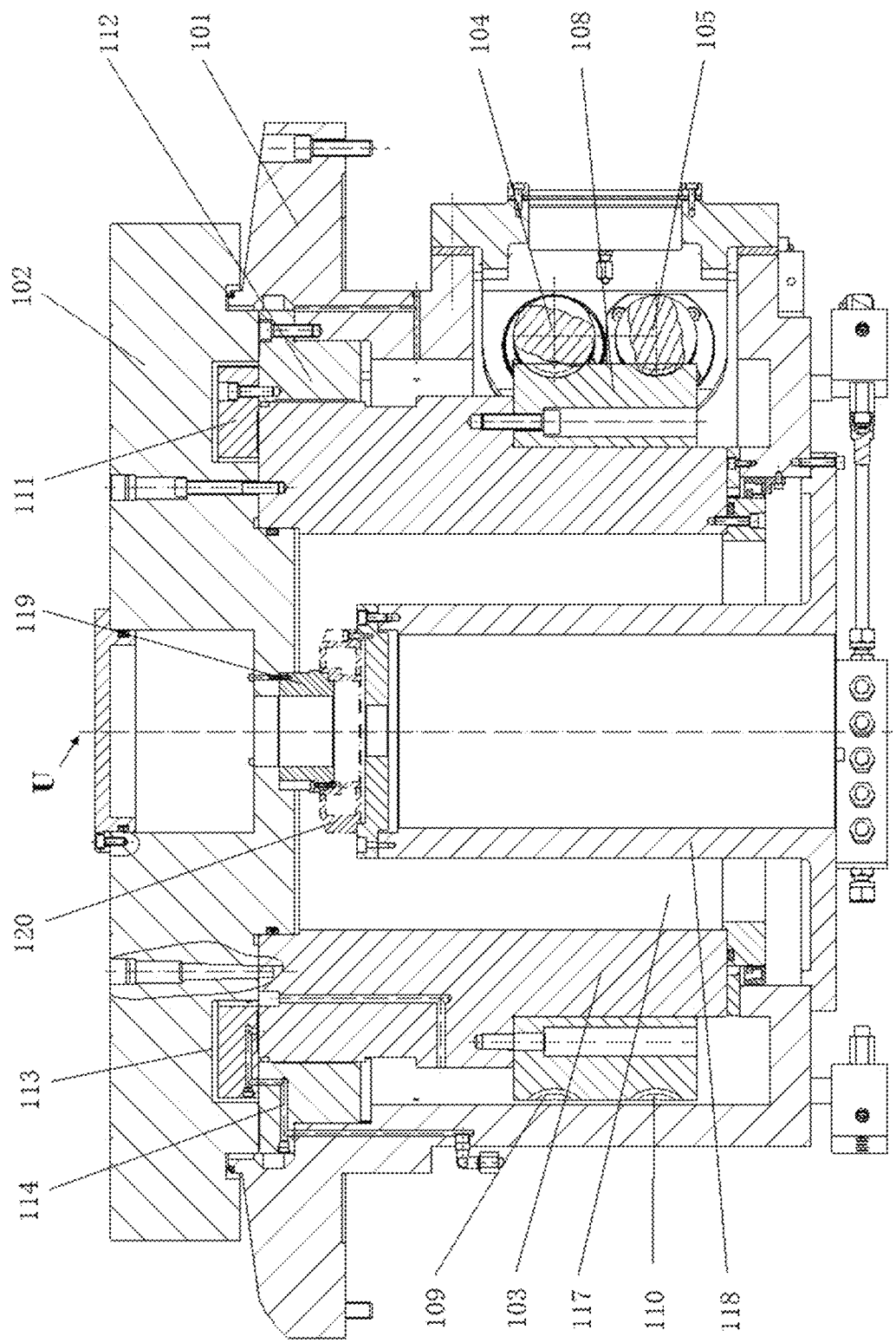
FIG. 8 is a schematic structural view of a workbench.
Figure 9:
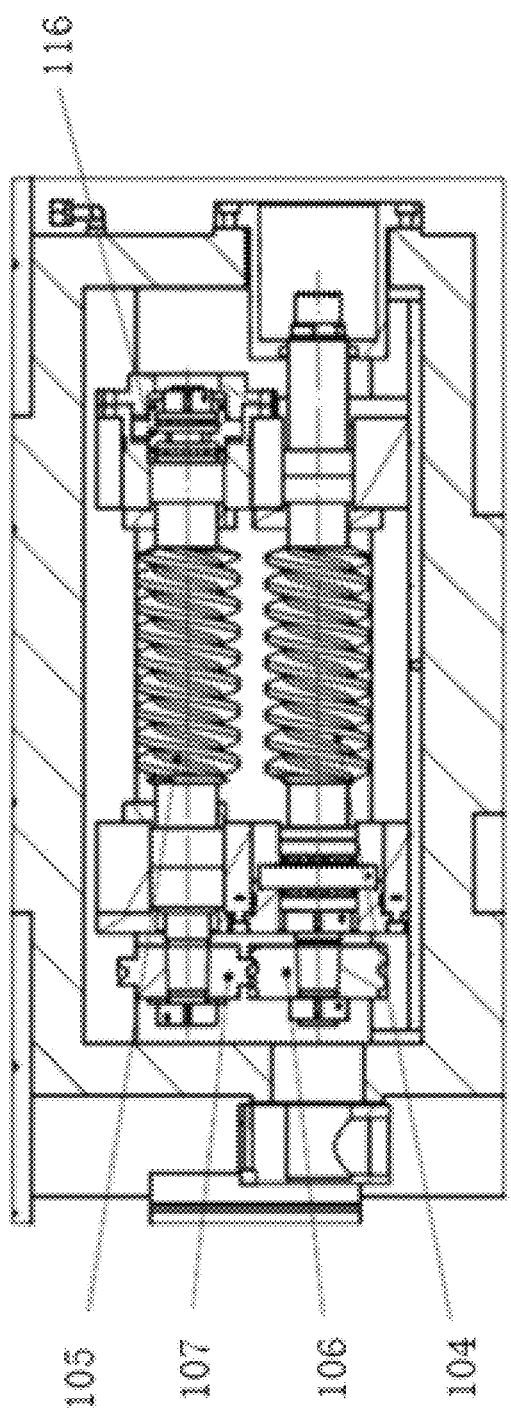
FIG. 9 is a schematic structural view of a worm and worm gear mechanism.
Figure 10:
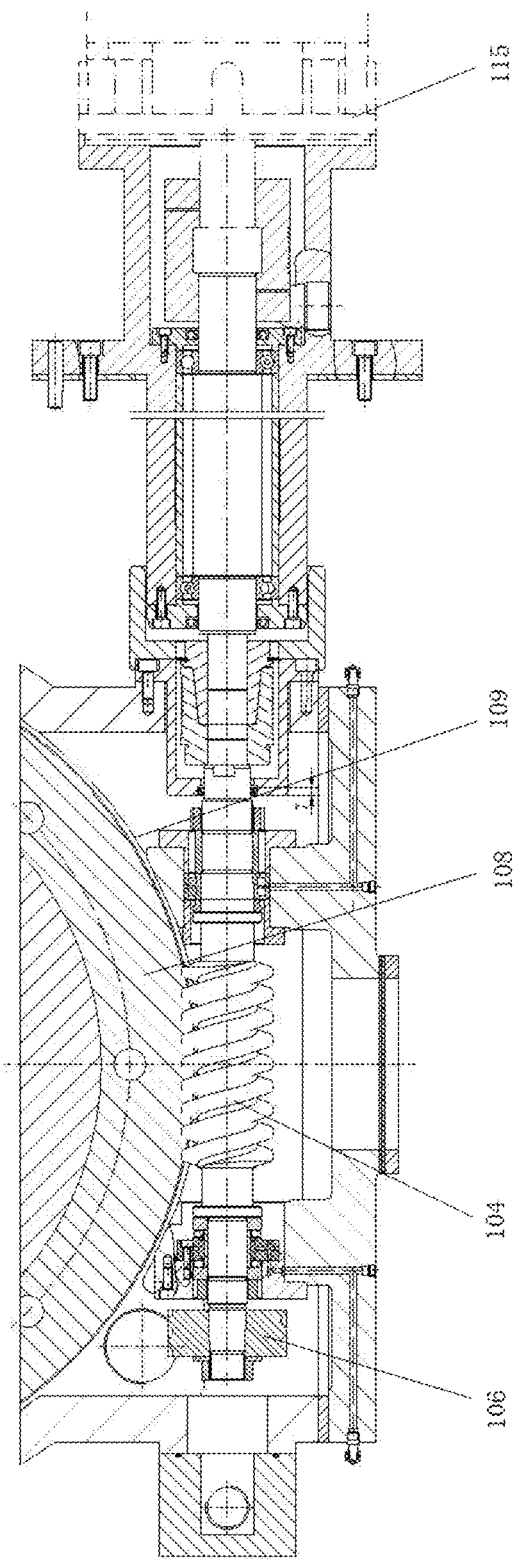
FIG. 10 is a schematic view of an engagement relation between an indexing worm and an indexing worm gear.
Figure 11:
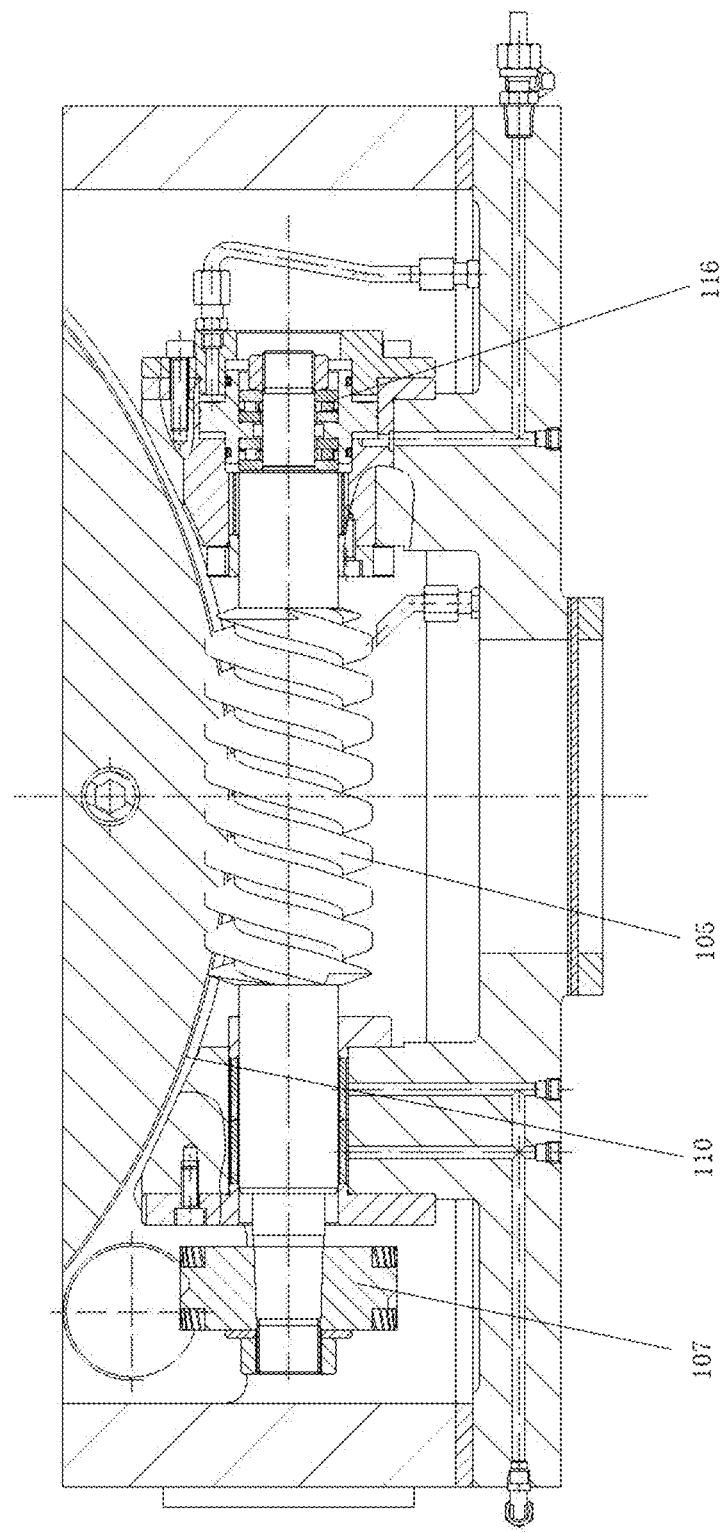
FIG. 11 is a schematic view of an engagement relation between a damping worm and a damping worm gear.

FIG. 1 is a schematic structural view of an embodiment of a worm gear machine according to the present disclosure. The worm gear machine in the embodiment includes a workbench 100 for clamping a worm gear workpiece, a cutter holder 200 for clamping a cutter and a cutter holder adjusting system for adjusting a position of the cutter holder 200 relative to the workbench 100. The cutter holder adjusting system in the embodiment includes a base 300, an X-direction guide rail 301 and a pedestal 302 in sliding fit with the X-direction guide rail 301 are arranged on the base 300, a Y-direction guide rail 303 perpendicular to the X-direction guide rail 301 and a cutter holder seat 304 in sliding fit with the Y-direction guide rail 303 are arranged on the pedestal 302, a Z-direction guide rail 305 is disposed on the cutter holder seat 304, and the Z-direction guide rail 305 is simultaneously perpendicular to the X-direction guide rail 301 and the Y-direction guide rail 303; and the big bracket 201 is mounted on the Z-direction guide rail 305 in sliding fit. Specifically, a ball screw mechanism and a servo motor 306 for driving the pedestal 302 to move along the X-direction guide rail 301 are arranged on the base 300, a ball screw mechanism and a servo motor 307 for driving the cutter holder seat 304 to move along the Y-direction guide rail 303 are arranged on the pedestal 302, and a ball screw and a servo motor 308 for driving the cutter holder 200 to move along the Z-direction guide rail 305 are arranged on the cutter holder seat 304. In the embodiment, the workbench 100 is fixedly connected to the base 300. The transmission chain of the worm gear machine in the embodiment includes one main axis and five servo axes. The six axes are respectively as follows: the motion of the pedestal 302 (X axis), the motion of the cutter holder seat 304 (Y axis), the motion of the cutter holder 200 (Z axis), the gyration of the cutter holder, the gyration of a hob spindle (B axis), and the rotation of the workbench (C axis). The linkage axes are B, C, X and Z axes for linkage, which is determined by the task of the worm gear machine for machining the worm gear.

The cutter holder 200 in the embodiment includes a big bracket 201, a first slide rail 202 is disposed on the big bracket 201, a slide seat 203 in sliding fit with the first slide rail 202 is disposed on the first slide rail 202, a second slide rail 204 is disposed on the slide seat 203, a small bracket 205 in sliding fit with the second slide rail 204 is disposed on the second slide rail 204, and the first slide rail 202 and the second slide rail 204 are parallel to each other; and a cutter holder spindle 206 is disposed between the big bracket 201 and the slide seat 203, a cutter bar 207 synchronously rotating with the cutter holder spindle 206 is disposed between an end of the cutter holder spindle 206 facing toward the small bracket 205 and the small bracket 205, and a gearbox 208 for driving the cutter spindle 206 to rotate is disposed in the big bracket 201; and a first hydrostatic bearing mechanism is disposed between the slide seat 203 and the cutter holder spindle 206, and a second hydrostatic bearing mechanism is disposed between the cutter bar 207 and the small bracket 205.

Specifically, the first hydrostatic bearing mechanism in the embodiment includes a first shaft sleeve 210 sleeved to the cutter holder spindle 206, and a first hydrostatic oil chamber is provided between the first shaft sleeve 210 and the cutter holder spindle 206. An inner hole of the first shaft sleeve 210 is a conical hole, a conical section fitting with the first shaft sleeve 210 is provided on the cutter holder spindle 206, and the conical hole and the conical section have the same conicity; and a first mounting portion 203a for mounting the cutter holder spindle 206 is disposed on the slide seat 203, and the first shaft sleeve 210 and a side of the first mounting portion 203a are in limiting fit and are provided therebetween with a first adjusting washer 211 for adjusting an axial position of the first shaft sleeve 210 relative to the conical section to adjust a fit clearance between the first shaft sleeve 210 and the conical section. By providing the inner hole of the first shaft sleeve 210 as the conical hole, providing the conical section fitting with the conical hole on the cutter holder spindle 206, and adjusting the axial position of the first shaft sleeve 210 relative to the cutter holder spindle 206, the fit clearance between the first shaft sleeve 210 and the cutter holder spindle 206 may be ensured, thereby ensuring the hydrostatic bearing clearance between the first shaft sleeve 210 and the cutter holder spindle 206, and ensuring that the hydrostatic bearing clearance is within the required range; and then, with the use of the reliable and stable hydrostatic system and hydrostatic adjusting element, the high accuracy and the high rigidity of the first hydrostatic bearing mechanism are ensured.

In the embodiment, a positioning plate 212 sleeved to the cutter holder spindle 206 is fixedly mounted on the other side of the first mounting portion 203a, and a thrust bearing 213 for bearing an axial force is respectively disposed on two sides of the positioning plate 212; and a first shaft shoulder positioned between the conical section and the positioning plate 212 is disposed on the cutter holder spindle 206, a side of the positioning plate 212 away from the first shaft sleeve 210 is provided with a limit sleeve 214 sleeved to the cutter holder spindle 206, and a side of the limit sleeve 214 away from the positioning plate 212 is provided with a spindle nut 215 in threaded fit with the cutter holder spindle 206, where one thrust bearing 213 is disposed between the positioning plate 212 and the first shaft shoulder, and the other thrust bearing 213 is disposed between the positioning plate 212 and the limit sleeve 214. The thrust bearing 213 is provided to bear the axial force during machining of the worm gear.

Specifically, a sealing mechanism is further disposed on two ends of the first hydrostatic oil chamber; and the sealing mechanism includes a sealing ring 216, a sealing sleeve 217, and a sealing ring 218, the sealing ring 216 is disposed between the first shaft sleeve 210 and the cutter holder spindle 206, the sealing sleeve 217 is sleeved to the limit sleeve 214, and the sealing ring 218 is disposed between the sealing sleeve 217 and the limit sleeve 214.

The second hydrostatic bearing mechanism in the embodiment includes a sleeve 220 sleeved to the cutter bar 207 in sliding fit and synchronously rotating with the cutter bar 207, a second shaft sleeve 221 is sleeved to the sleeve 220, and a second hydrostatic oil chamber is provided between the second shaft sleeve 221 and the sleeve 220. Specifically, an outer wall of the second shaft sleeve 221 in the embodiment is a conical surface, a conical through hole fitting with the conical surface is provided on the small bracket 205, and the conical surface and the conical through hole have the same conicity. Specifically, the conicity of the conical surface and the conical through hole is 0.5°-5°, preferably 1°, to meet the use requirement. An expansion seam 222 is provided on the second shaft sleeve 221 along a longitudinal direction of the second shaft sleeve, and a clearance adjusting mechanism for adjusting an axial position of the second shaft sleeve 221 relative to the conical through hole to adjust a fit clearance between the second shaft sleeve 221 and the sleeve 220 is disposed on the small bracket 205. The clearance adjusting mechanism includes a cover plate 227 respectively disposed on two sides of the small bracket 205, where a clearance adjusting washer 228 is disposed between one cover plate 227 and the second shaft sleeve 221, and an adjusting washer 229 is disposed between the other cover plate 227 and a sidewall of the small bracket 205. The axial position of the second shaft sleeve 221 relative to the conical through hole may be adjusted by changing a thickness of each of the clearance adjusting washer 228 and the adjusting washer 229. Therefore, the expansion seam 222 shrinks by applying a radial pressure to the second shaft sleeve 221 to decrease the size of the inner hole of the second shaft sleeve 221, or the expansion seam 222 stretches under the action of the own elastic deformation by loosening the second shaft sleeve 221 to increase the size of the inner hole of the second shaft sleeve 221, and thus the clearance of the second hydrostatic oil chamber between the second shaft sleeve 221 and the sleeve 220 is adjusted. Adjusting the clearance of the second hydrostatic oil chamber to be very small reduces the wear and improves the rigidity on one hand, and improves the transmission accuracy on the other hand. Specifically, an elastomer 246 for sealing the second hydrostatic oil chamber is respectively disposed between the two cover plates 227 and the sleeve 220. A limit clamp ring 247 is respectively disposed on two ends of the sleeve 220. The limit clamp ring 247 and the second shaft sleeve 221 are in limiting fit to avoid falling of the sleeve 220 from the second shaft sleeve 221.

Specifically, in the embodiment, a plurality of deformation grooves 223 are further annularly and uniformly distributed on an outer sidewall of the second shaft sleeve 221, each deformation groove 223 is arranged along the longitudinal direction of the second shaft sleeve 221, and a metal rubber elastomer 248 for driving the second shaft sleeve 221 to deform adaptively is disposed in each deformation groove 223. The metal rubber elastomer 248 has intrinsic characteristics of the selected metal in special and extreme environments (high temperature or violent vibration), and is as elastic as the rubber, unvaporized in spatial environments, and resistant to the high temperature, space radiation and particle impact. The selection of different metals may further be adaptive to corrosion-resistant environments, and achieve the characteristics of aging resistance, vibration damping, etc. The deformation groove 223 facilitates the driving of the second shaft sleeve 221 for deformation to adjust the clearance of the second hydrostatic oil chamber. The number of deformation grooves and the grooving width may be determined according to the shape and size of the second shaft sleeve 221. Specifically, there may be 4-9 deformation grooves, of which the length is the length of the second shaft sleeve 221 in an axial direction, the depth is 0.3-0.7 times of a radial thickness of the second shaft sleeve 221, and the grooving width is 0.01-1.5 mm. The expansion seam 222 has a length equal to the length of the second shaft sleeve 221 in the axial direction, and a width of 0.001-1 mm. An oil groove 224 is further provided on an inner wall of the second shaft sleeve 221, an oil hole 225 interconnected with an outer wall of the second shaft sleeve 221 is provided in the oil groove 224, and an annular oil groove 226 corresponding to the oil hole 225 is provided on an inner wall of the conical through hole. Specifically, the number of oil grooves 224 is a half of the number of deformation grooves, and there are 1-5 oil holes 225. Preferably, in the embodiment, there are 6 deformation grooves 223 having the depth equal to 0.6 times of the radial thickness of the second shaft sleeve 221 and the width of 0.2 mm; the expansion seam 222 has the width of 0.02 mm; and there are 3 oil grooves 224, and 2 oil holes 225 in each oil groove 224, all of which can meet the use requirements.

Specifically, in the embodiment, a central through hole is provided in the cutter holder spindle 206, the central through hole is provided with a conical hole 249 on an end facing toward the small bracket 205 and a counter bore on the other end, an inner diameter of the conical hole 249 gradually increases along a direction of the cutter holder spindle 206 toward the cutter bar 207, and an end of the cutter bar 207 connected to the cutter holder spindle 206 is provided as a conical connecting section fitting with the conical hole 249. A connecting rod 250 is disposed in the central through hole, and the connecting rod 250 includes one end in threaded connection with the cutter bar 207 and the other end provided with a collar in limiting fit with the counter bore.

Further, a first rotating shaft 230 parallel to the cutter holder spindle 206 is disposed in the gearbox 208, a first gear 231 and a second gear 232 that respectively and synchronously rotate with the cutter holder spindle 206 are arranged on the cutter holder spindle 206, a third gear 233 simultaneously engaged with the first gear 231 and the second gear 232 is disposed on the first rotating shaft 230, and a difference in the number of teeth between the first gear 232 and the second gear 231 has an absolute value of 1. In the embodiment, a first boss extending axially is disposed on the first gear 231, the second gear 232 is mounted on the first boss and synchronously rotates with the first gear 231, and a baffle 238 for axially limiting the second gear 232 is disposed on the first gear 231. By providing the first gear 231 and the second gear 232 as synchronously rotating and being simultaneously engaged with the third gear 233, the difference in the number of teeth between the first gear 231 and the second gear 232 has the absolute value of 1. In the embodiment, the number of teeth of the second gear 232 is one more than that of the first gear 231. Therefore, the worm gear machine can effectively eliminate the clearance between teeth, solves the problems of gear transmission of the conventional cutter holder in intertooth impact, large noise of the cutter holder, low transmission accuracy and the like, guarantees the transmission stability, lowers the noise, ensures the transmission accuracy and gear cutting accuracy, and has the characteristics of skillful design, simple structure, easiness in improvement, low improvement cost, etc.

Further, a transmission gear shaft 234 is sleeved to the cutter holder spindle 206, and both the first gear 231 and the second gear 232 synchronously rotate with the transmission gear shaft 234; and one end of the transmission gear shaft 234 is provided with a connecting disc 235 fixedly connected to the transmission gear shaft 234, the connection disc 235 is provided as at least two lobes, and a flat key 236 fitting with the cutter holder spindle 206 is disposed between two adjacent lobes of connection disc 235. In the embodiment, the connection disc 235 is provided as two lobes; and the coaxiality between the cutter holder spindle 206 and the transmission gear shaft 234 may be adjusted through the flat key between the two lobes of connection disc 235 to ensure the transmission accuracy. When the transmission gear shaft 234 rotates, the connection disc 235 may be driven to rotate; and the connection disc 235 clamps the cutter holder spindle 206 and the flat key 236 in the middle and makes the gyration together with the transmission gear shaft 234. The clearance therein may be adjusted to be very small by match grinding to improve the transmission accuracy of the spindle; and when there is a need to move the cutter, the slide seat may drive the cutter holder spindle 206 to slide between the two lobes of connection disc 235. Specifically, a cylindrical roller bearing 237 for bearing a radial force is disposed between a box body of the gearbox 208 and the transmission gear shaft 234.

Specifically, a second rotating shaft 239 and a third rotating shaft 240 that are parallel to the first rotating shaft 230 are further arranged in the gearbox 208, a fourth gear 241 and a fifth gear 242 engaged with each other are arranged between the first rotating shaft 230 and the second rotating shaft 239, a sixth gear 243 and a seventh gear 244 engaged with each other are arranged between the second rotating shaft 239 and the third rotating shaft 240, and one end of the third rotating shaft 240 is transmissively connected to a power motor 245.

Further, the workbench 100 includes a housing 101, a workbench body 102 is disposed on the housing 101, a mandrel 103 and a worm and worm gear mechanism for driving the mandrel 103 to rotate are arranged in the housing 101 of the workbench, and the workbench body 102 is fixedly connected to the mandrel 103 and synchronously rotates herewith. Specifically, the worm and worm gear mechanism in the embodiment includes an indexing worm 104 and a damping worm 105 parallel to each other in axis, same ends of the indexing worm 104 and the damping worm 105 are respectively provided with a first engagement gear 106 and a second engagement gear 107 engaged with each other, a transmission ratio of the first engagement gear 106 to the second engagement gear 107 is equal to 1, and the indexing worm 104 and the damping worm 105 have the same helix angle but opposite rotation directions. A mandrel sleeve 108 synchronously rotating with the mandrel 103 is sleeved to the mandrel 103, an indexing worm gear 109 engaged with the indexing worm 104 and a damping worm gear 110 engaged with the damping worm 105 are arranged on the mandrel sleeve 108, the indexing worm 104 is transmissively connected to a power component, and a micro-motion component for driving the damping worm 105 to slightly move along an axial direction thereof to ensure zero-clearance engagement between the damping worm 105 and the damping worm gear 110 is disposed on the damping worm 105. Specifically, the power component includes a workbench motor 115 transmissively connected to the indexing worm 104, the micro-motion component 116 is a hydraulic cylinder on one end of the damping worm 105, and one end of the damping worm 105 extends into the hydraulic cylinder and is provided with a piston fitting with the hydraulic cylinder, that is, the damping worm 105 simultaneously serves as a piston rod of the hydraulic cylinder. An axial acting force may be applied to the damping worm gear 110 with the hydraulic cylinder, such that the damping worm 105 moves slightly to a direction opposite to the rotation of the damping worm gear 110. It is ensured that the worm and the worm gear are always in the zero-clearance engagement, thereby achieving zero clearance of the indexing pair of the workbench, eliminating the unstable phenomenon due to vibration arising from the clearance during cutting, and improving the dynamic rigidity and the gear cutting accuracy. Meantime, as the worm and worm gear mechanism uses the double worm and the double worm gear, the worn worm gear can still keep zero-clearance machining, and the readjustment on the clearance of the worm gear pair due to the wear to keep the desired accuracy of the indexing pair turns out to be unnecessary. The embodiment improves the indexing accuracy of the workbench 100. The radial straightness of the workbench surface is 0.012 mm, the radial circular run-out of the gyration axis is 0.001 mm, the axial motion is 0.001 mm, and the axial circular run-out is 0.002 mm.

Further, in the embodiment, an axial hydrostatic guide rail 111 and a radial hydrostatic guide rail 112 are arranged between the housing 101 and the mandrel 103; the axial hydrostatic guide rail 111 is coaxial with the mandrel 103 with a common axis U and disposed on an upper end surface of the mandrel 103, and an annular groove 113 for avoiding the axial hydrostatic guide rail 111 is provided on an undersurface of the workbench body 102; the radial hydrostatic guide rail 112 is coaxial with the mandrel 103 with the common axis U and sleeved to the mandrel 103; and a hydraulic oil passage 114 for providing hydraulic oil between the axial hydrostatic guide rail 111 and a fitting surface of the mandrel 103 as well as between the radial hydrostatic guide rail 112 and the fitting surface of the mandrel 103 to form a hydraulic oil film is provided in the housing 101. By providing the axial hydrostatic guide rail 111 and the radial hydrostatic guide rail 112, the influence from a frictional heating effect of the conventional bearing is eliminated. Due to the presence of the oil film, the mandrel 103 does not generate direct friction with the workbench body 102 and the housing 101 to avoid the motion heat, thereby improving the gyration accuracy of the workbench. As the direct friction is eliminated, the hydrostatic bearing has a longer service life than the conventional bearing, to obviously save the post-maintenance cost and reduce the maintenance difficulty.

Specifically, in the embodiment, a through hole 117 is provided in the mandrel 103, a base 118 fixedly connected to the housing 101 is disposed in the through hole 117, a connecting seat 119 is disposed on the undersurface of the workbench body 102, and a high-accuracy circular grating 120 is disposed between the base 118 and the connecting seat 119.

By providing the workbench and the cutter holder, the worm gear machine provided by the embodiment adjusts a position of the cutter holder relative to the workbench by use of the cutter holder adjusting system, thereby machining the worm gear workpiece on the workbench with the cutter on the cutter holder. Specifically, by providing the cutter holder as the big bracket, the slide seat and the small bracket that are mutually in sliding fit, mounting the cutter holder spindle between the big bracket and the slide seat, and mounting the cutter bar between the cutter holder spindle and the small bracket, the embodiment can conveniently drive an axial motion between the cutter holder spindle and the cutter bar to change the cutter; and by providing the first hydrostatic bearing mechanism between the slide seat and the cutter holder spindle, and the second hydrostatic bearing mechanism between the cutter bar and the small bracket, the embodiment can improve the rigidity and transmission accuracy of the cutter holder spindle and the cutter bar, to meet the requirements of machining the worm gear at the high accuracy and high efficiency.

Specific implementations applied to the worm gear machine of the embodiment in closed-loop control of the servo axis, static-dynamic response characteristics of the servo axis, and servo optimization will be described below.

Figure 12:
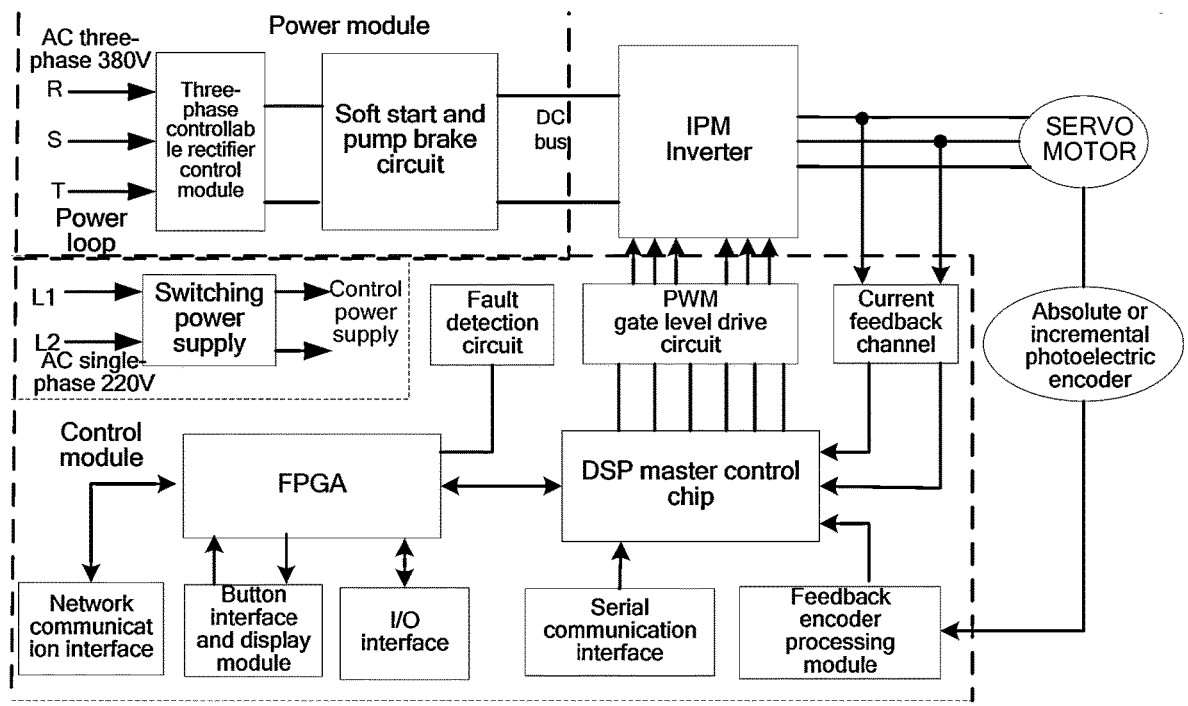
FIG. 12 is a circuit diagram of an all-digital alternating current (AC) driving hardware platform.

1. Design for Software and Hardware Unified Platform of all-Digital Driving Apparatus FIG. 12 is a circuit diagram of an all-digital AC driving hardware platform. As the system requires that hardware can not only support the high-speed, high-accuracy and flexible signal processing, but also accomplish the high-accuracy servo control operation, it is very crucial to reasonably design various functional modules of the hardware platform of the all-digital AC driving apparatus with a high-performance digital signal processor (DSP) and a large-scale field programmable gate array (FPGA). To accomplish the servo function and spindle control function at a high response and a high accuracy on the hardware platform, the control software modules should also be managed orderly under the scheduling of a real-time control core. Meantime, there is a further need to design various high-accuracy servo control algorithms and signal acquisition and processing algorithms, and various functional requirements on synchronous coordination, interface management and so on, and this is a very critical fundamental issue.

The unified hardware control platform has the following design concept: The control platform of the servo driving apparatus is established with a new-generation high-performance DSP and a high-capacity FPGA, and the power conversion module of the driving apparatus is established with a new-generation intelligent power module (IPM) as a core, thereby designing the all-digital AC driving hardware platform of a unified structure. With the support of the software platform and in cooperation with different application software modules, AC permanent-magnet synchronous servo motors, AC induction type asynchronous spindle motors, AC permanent-magnet synchronous spindle motors, AC permanent-magnet linear motors, and AC permanent-magnet torque motors may be respectively controlled. The hardware circuit is mainly composed of two parts: a control platform and a power conversion platform (including an AC-direct current (DC) rectifier power supply, a DC-AC inverter and a switching power circuit), as shown in FIG. 12.

In the control platform, the high-performance DSP TMS320LF2812 having a 32-bit fixed-point operation function is employed to accomplish all-digital vector control and closed-loop servo control in highly real time, and the large-scale FPGA EP4CE22 is employed to accomplish functions such as external input/output (I/O) signal management, fault signal processing, control parameter setting, keyboard processing, state display, serial communication, real-time universal encoder interface processing, and high-accuracy current detection.

The universal instruction interface may be adaptive to different types of instruction interface modules to which different types of instruction interfaces (including various field buses and the basic simulated quantity and pulsed quantity signal, etc.) are connected. The universal encoder interface may be connected to an absolute value encoder, a sine-cosine encoder, an incremental encoder and other feedback elements. The high-accuracy current detection implements denoising measurement on a current signal in real time, to meet the high-accuracy, high-response and digital servo control requirements.

The power conversion platform includes an independent controllable AC-DC rectifier power supply, a soft start and pump discharge control circuit, a DC-AC inverter, a switching power supply and other power circuits. The power device of a different power may form a driving apparatus of a different power specification.

2. Design for Software Unified Technical Platform of Driving Apparatus

Figure 13:
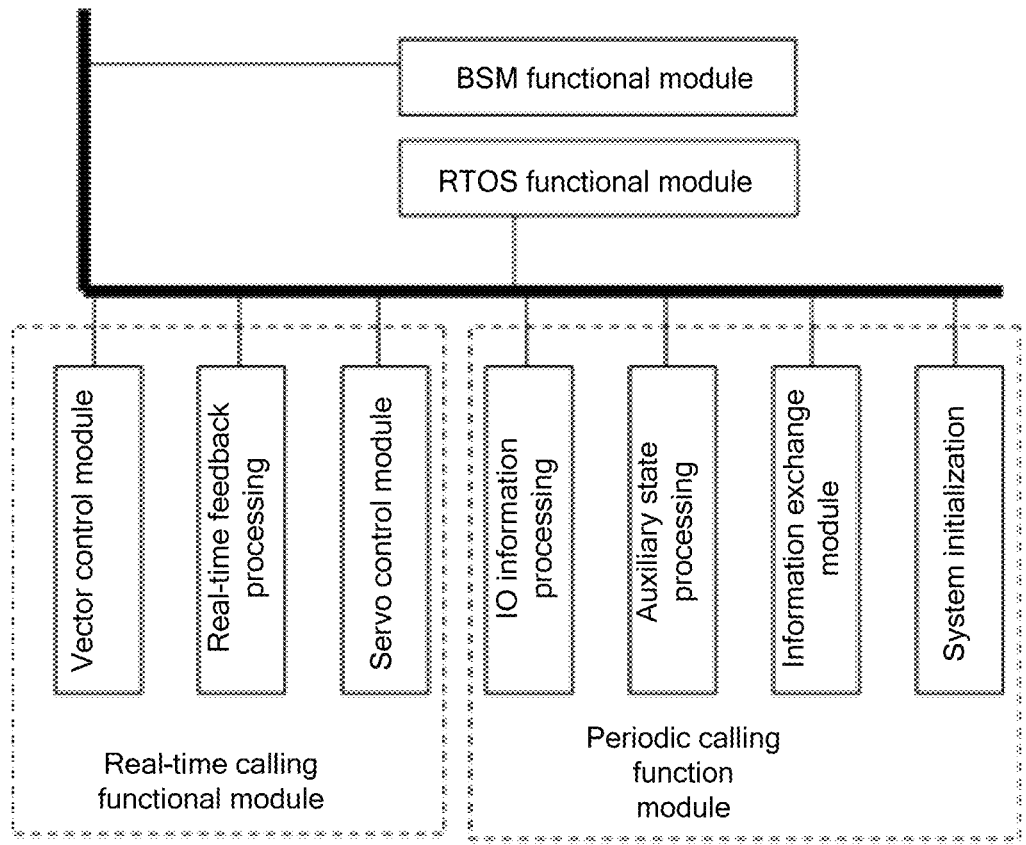
FIG. 13 is a schematic view of a scheduling structure of a control software platform of an all-digital AC driving apparatus.

The basic software platform of the driving apparatus is developed with a module encapsulation method in forms of a scheduling management architecture and a data structure of a real-time operation system; various control functional modules are developed according to requirements of the system on control structures, control functions and multi-motor operating modes; and the all-digital control is performed on a universal basic real-time control software platform, to implement the servo control at the high speed, high accuracy and high response. The software platform has a scheduling management mode shown in FIG. 13.

The software framework is divided into three parts according to the basic principle of the real-time operation system. First of all, basic system management (BSM), including kernel hardware configuration, system hardware configuration, system parameter control and state initialization, is performed. Then, a periodic task scheduling management framework calibrated based on timer interruption is established for tasks such as processing fault information, IO information and service channel information at different time, managing parameters and processing the display. All tasks are programmed modularly, encapsulated with a structural method and processed by calling a function, to improve the reliability and execution efficiency of the software. At last, a timer processing interruption framework and an event trigger interruption framework, both of which possess a real-time processing capacity, are designed to process a closed-loop servo control function and a state information service of the system.

Not only the timeliness, but also the expansibility and maintainability are taken into account more in software design of the servo driver. Hence, the modular and hierarchical design concept is used. The whole servo-drive unit is procedurally divided into a plurality of modules, with each module completing one subfunction. These modules are combined into a whole, to meet the servo control function. Information contained in each module is unaccessible to other modules for which the information is unnecessary. Independent modules only exchange information that must be exchanged for completion of the system function. The basic principle for hiding information is independent in function, high in cohesion and low in coupling.

The software design for the servo control fully adheres to a system that is coupled loosely as much as possible, and in which modules are associated simply and any error at one place is unlikely propagated to other places. In this sense, the understandability, testability, reliability and maintainability of the system are greatly affected by the degree of coupling between the modules. Two modules exchange information through parameters and the exchanged information is the data only.

Figure 14:
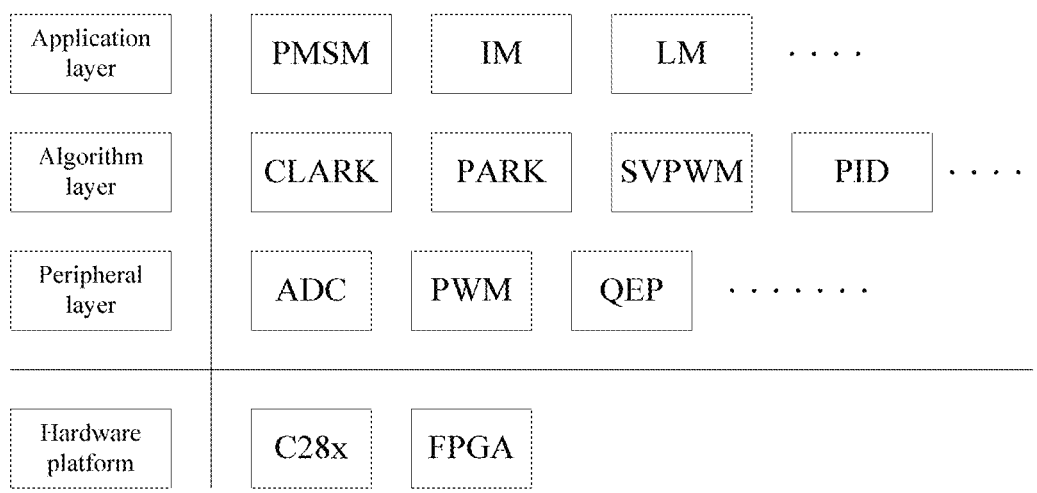
FIG. 14 is a schematic view of an implementation architecture of a software hierarchical block diagram of a control software platform of an all-digital AC driving apparatus.
Figure 15:
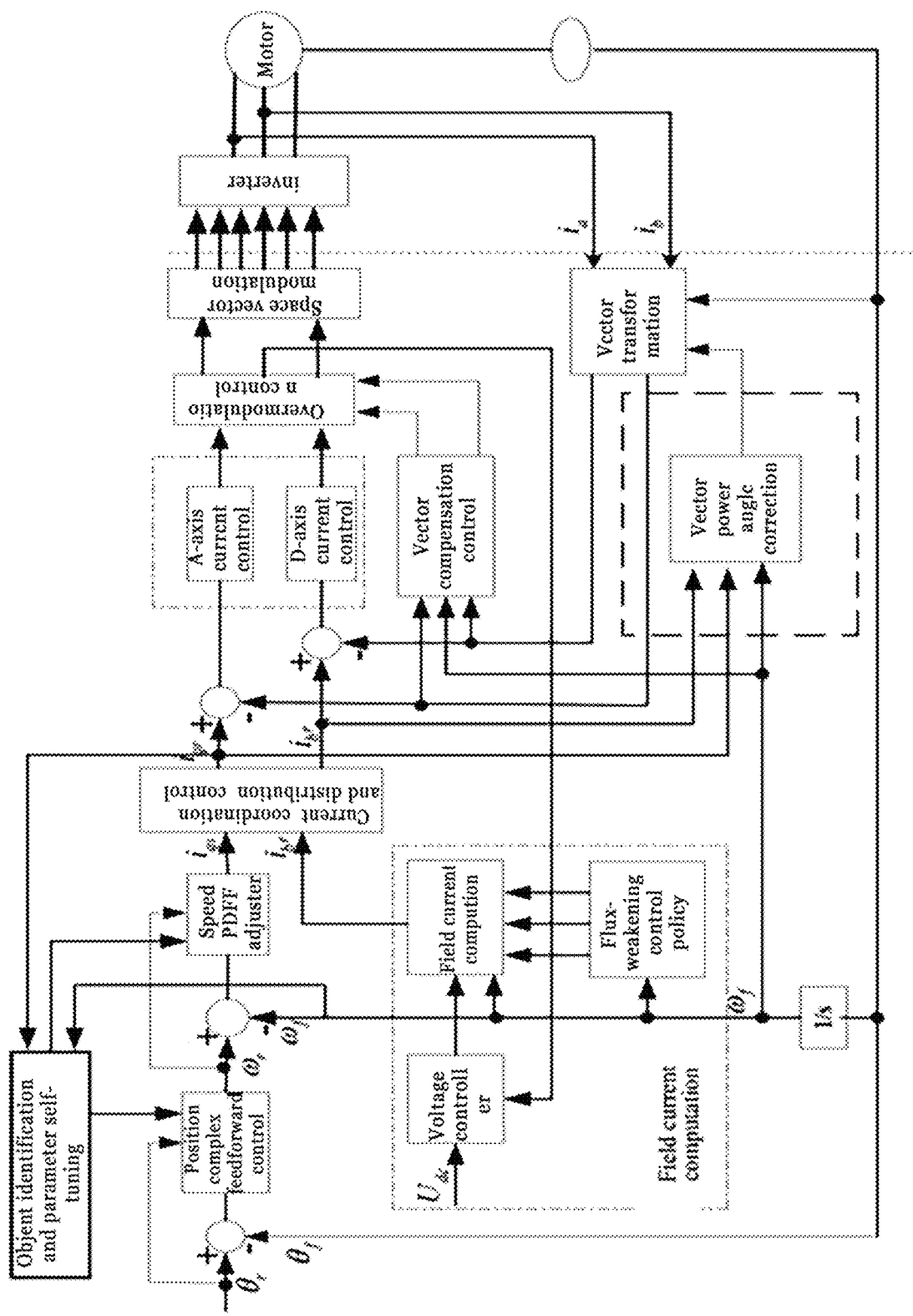
FIG. 15 is a block diagram of a modular structure of an all-digital AC driving system.

Therefore, on different hardware platforms, there are a peripheral layer, an algorithm layer and an application layer in sequence, as shown in FIG. 14. The peripheral layer mainly includes a peripheral definition on a chip, such as a definition on an analog to digital converter (ADC) sampling channel, a definition on a pulse-width modulation (PWM) pin, a definition on an I/O interface, etc. These definitions are determined by different hardware platforms. The algorithm layer is independent of the different specific hardware platforms, for example, various transformers, adjusters and the like in motor control. The algorithm layer may be transplanted to different hardware platforms. On the application layer, different application programs and the like are called according to different application occasions. The control block diagram of the all-digital AC driving apparatus based on the unified motor theory is as shown in FIG. 15.

Different servo control functions may be implemented by combining different functional modules, with the purpose of meeting different system application requirements. There are the following policies that are designed to control the AC permanent-magnet synchronous servo motors:
1) Servo control for positions and speeds at the high accuracy and high response;
2) Unified a-axis and d-axis current control, and overmodulation processing policy based on the limit circle;
3) Flux-weakening acceleration control policy based on the voltage limit circle;
4) Double-drive torque and rotational speed master-slave synchronization control policy; and
5) Unified information processing policy for multipolar logarithmic motors and multiresolution photoelectric encoders.

There are the following policies for controlling the AC induction type asynchronous spindle motors:

Servo control for positions and speeds; unified a-axis and d-axis current vector control algorithms; flux-weakening current setting control algorithms based on voltage control; control algorithms for coordinating, tracking, optimizing and distributing current vectors; and algorithms for correcting power angles of slip vectors. The core policies for controlling the controllable rectifier power supply are voltage and current double-closed-loop control; unified software and hardware phase-locked-loop vector control algorithms; voltage-based self-adaptive reactive power control algorithms; and network phase sequence self-adaptive control algorithms.

3. High-Accuracy Servo Control

For numerical control machining, there are increasingly higher requirements on the operating speed and stability of the machine tool. At present, it is the common practice for servo driver products in home and abroad to employ a high-resolution absolute encoder to greatly improve the feedback accuracy. As the feedback resolution is often 17-bit or above, the positioning and operating accuracies of the drive system are greatly improved, and both the speed fluctuation and the torque fluctuation are minimized. Meantime, new algorithms, such as the friction compensation, torque feedforward, and adaptive notch filter, may be better implemented, and the bandwidth and response characteristic of the system are also greatly enhanced.

There are the following key servo control technologies that have been accomplished in the drivers till now:

(1) High-Accuracy Feedback Signal Processing and High-Speed Hardware Current Loop Vector Control Technologies Upon the completion of multi-axis current vector control in the FPGA, a high-speed and high-accuracy full hardware control method for a current loop of a multi-axis servo motor is developed. With the FPGA as a core control unit, the control system includes a parallel bus communication interface module for the FPGA and a microprocessor, an encoder processing interface module, an AD sampling control module, a current conditioning module, a vector transformation module, a coordinated rotation digital computer (CORDIC) rotary iteration module, a high-performance complex vector adjuster module, a multi-axis space vector pulse width modulation (SVPWM) operation module, a standard PWM output interface and a time sequence planning module. The current control sampling clock is at 60 MHz, and the time for completing one time of single-axis current control is less than 2 us.

(2) High-Accuracy Hardware Decoding Technologies with Sine-Cosine Encoders

Figure 16:
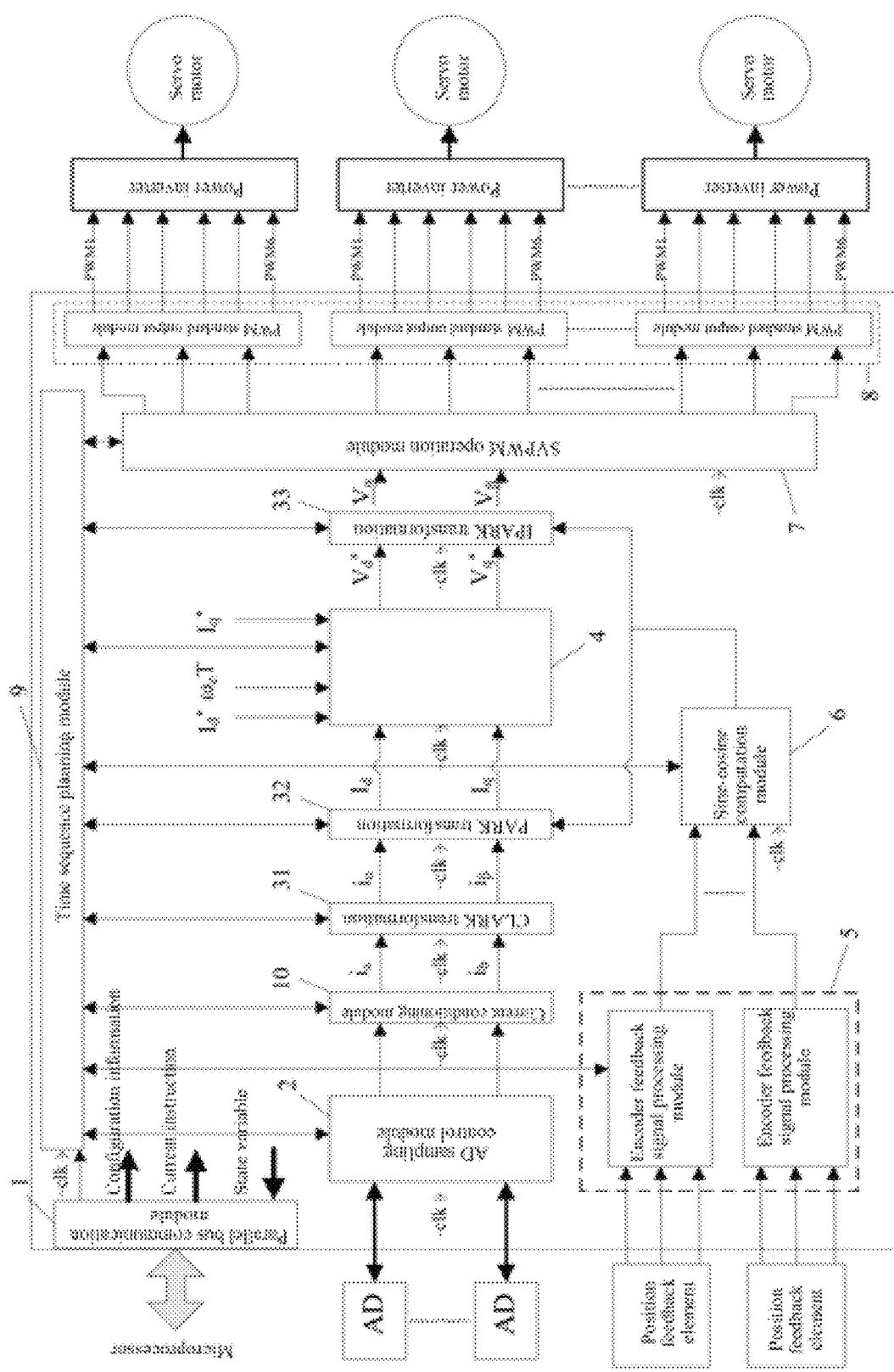
FIG. 16 is a flow chart of a multi-axis hardware current vector control structure.

With the utilization of the hardware FPGA resource, the A/D conversion for a sine-cosine analog signal of the encoder is strictly synchronous to periodic signal counting on the hardware, and the error resilient decoding alignment between the interpolation arctangent computed result and the count value is implemented on the FPGA, to ensure the signal processing accuracy and implement 256-fold interpolation segmentation. The final resolution for processing the feedback signal of the encoder may be up to 23 bits. FIG. 16 is a flow chart for high-speed and high-accuracy hardware current vector control.

(3) High-Accuracy Servo Control Algorithms and Parameter Self-Adaptive Optimization Technologies For the three-closed-loop feature of the servo control, 16-bit oversampling real-time current denoising detection algorithms, speed feedback pulse width measuring algorithms (the resolution for speed feedback computation is 0.001 rpm), 32-bit high-accuracy and high-speed complex feedforward control algorithms, and 64-bit high-accuracy position adjustment complex control algorithms are mainly developed by means of denoising a signal, reducing a quantized truncation error and improving a valid word-length of a variable, to improve the steady-state accuracy and transient performance of the system overall, thereby implementing high-accuracy smooth control on the digital AC servo system. 64 motor parameter description databases of different specifications, and the application type modes are established according to different pedestal types and power parameters of the motor. Parameters of a controller may be automatically adapted according to different applications and motor types; and meanwhile, with a digital communication function of the absolute encoder of the servo motor, the function as an "electronic tag" is implemented, the parameters of the motor may be automatically adapted, and the basic parameters of the controller are automatically set.

Figure 17A:
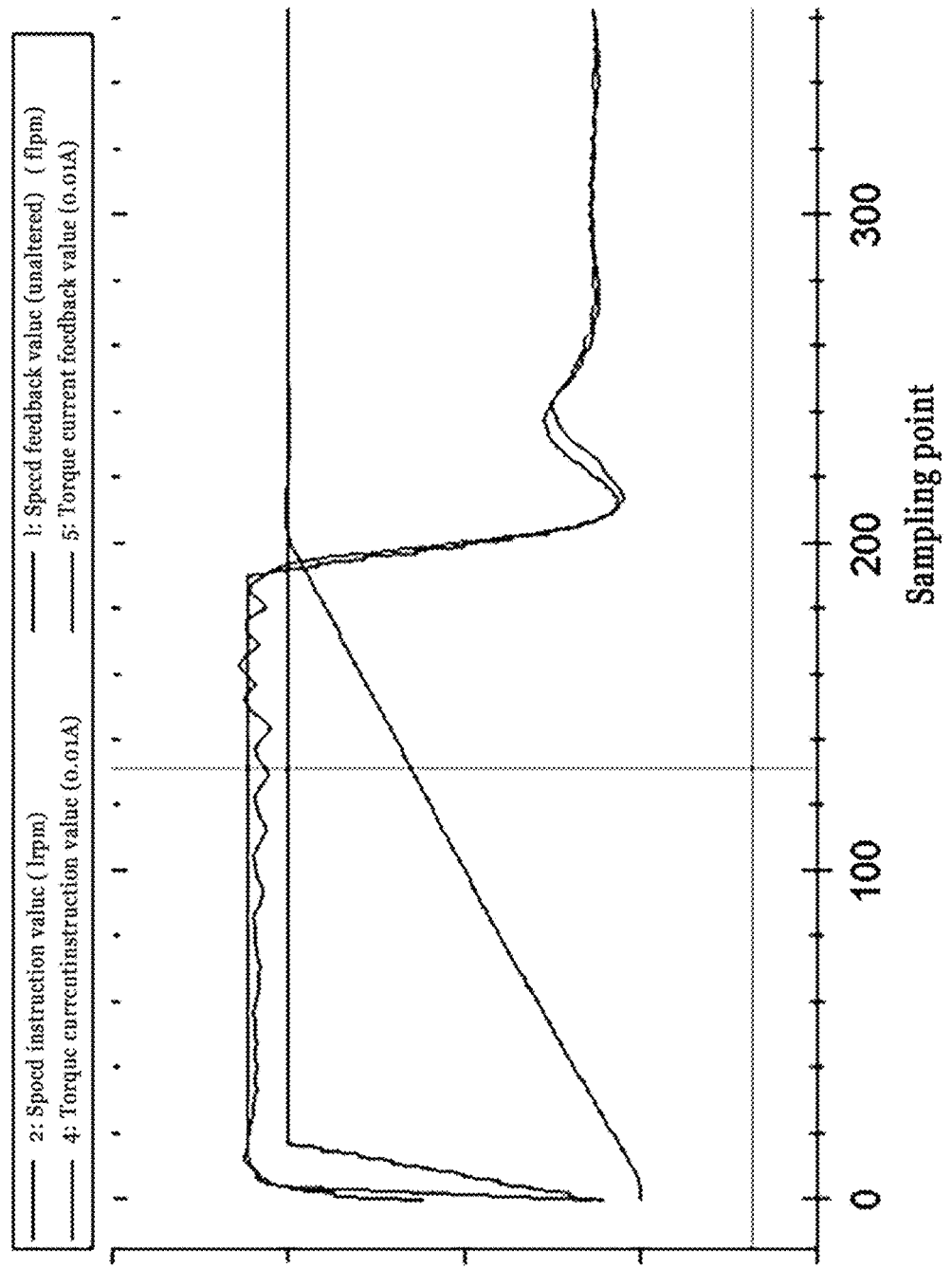
FIG. 17*a* and FIG. 17*b* are implementation of high-accuracy and high-response servo control.
Figure 17B:
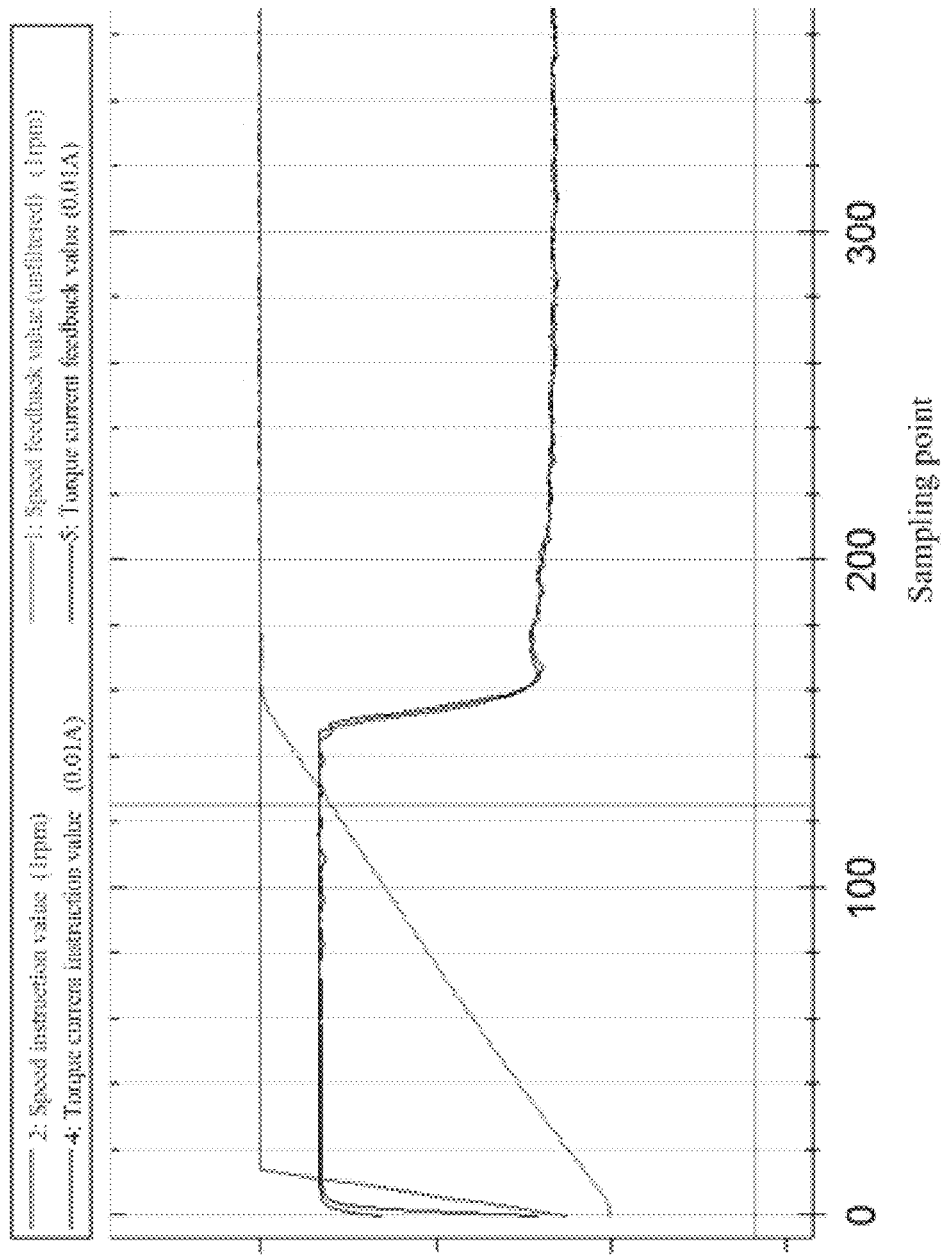

There are the following main performance indicators of the driving apparatus system that have been tested and verified in site till now:

The resolution for position feedback of the synchronous servo system is up to 29 bits, the current sampling period for the servo control is up to 31.25 us (including the sine-cosine encoder segmentation, the full-closed-loop control, etc.), the maximum rotational speed for controlling the AC synchronous servo motor is 7,200 rpm, the maximum frequency for controlling the AC asynchronous spindle is 800 Hz (24,000 rpm), and the minimum resolution for speed control may be up to 0.001 rpm. FIG. 17a and FIG. 17b are response comparison result for hardware current vector control.

In the spindle servo-drive control policy of the Huazhong 8 series system, a "motor wide-range maximum torque control algorithm based on indirect rotor field orientation" is used, to implement the high-response and wide-frequency control performance of the spindle motor.

Typically, conventional spindle driving solutions mainly give considerations to the single distribution problem of the exciting current, and often employ a "1/w, flux-weakening method" and related improved algorithms. Such algorithms are an open-loop field current giving method in which the field current is inversely proportional to the rotational speed in the flux-weakening region, and are easily achieved in engineering. However, as these algorithms take neither the influence of a change of inductance of the motor on the field current during flux weakening nor the severe restriction of the voltage vector distribution policy on the current response in high frequency domains into overall considerations, and cannot make a corresponding adjustment on the field current according to an actual load change, it is cumbersome to obtain the desired maximum torque for output within the wide range, or even the current is out of control in a severe condition.

For the "motor wide-range maximum torque control algorithm based on indirect rotor field orientation" proposed in the spindle driver control policy, it comprehensively considers the current vector distribution, voltage vector optimized coordination, real-time field orientation adjustment and other problems, and can make the current approach to an optimal current control trajectory quickly to obtain the maximum torque for output; and meanwhile, with the effect of flexibly distributing the voltage vector, the current control is responded quickly and smoothly, to ensure the stability of the system within a wide frequency range.

Figure 18:
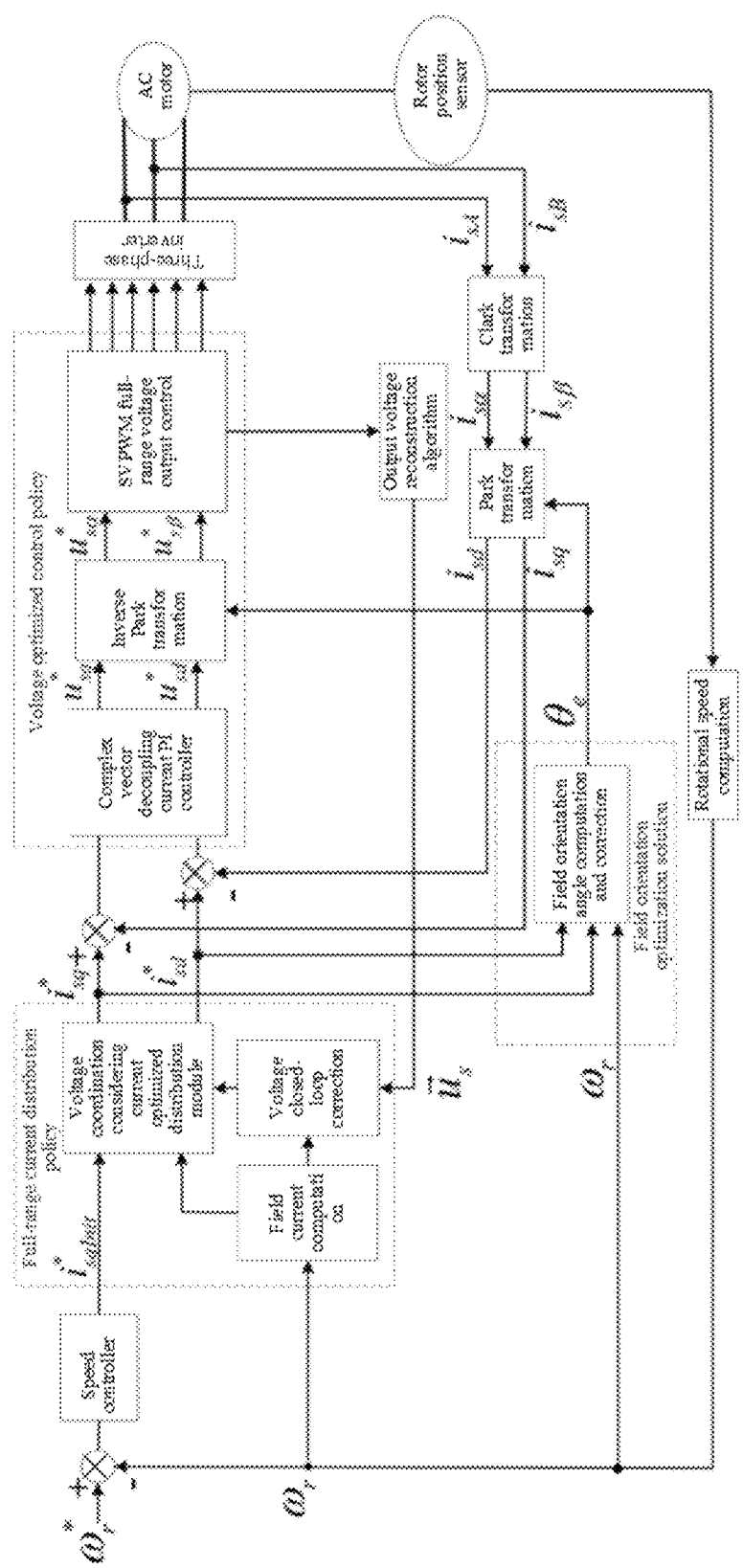
FIG. 18 is a schematic view of unified control of an AC motor wide-range speed adjustment system.

According to a decoupling control model for rotor field orientation, a unified control platform for a double-closed loop speed adjustment system of an AC motor shown in FIG. 18 may be established. The field orientation angle $\theta_e$, which is the key to implement the field orientation vector control of the AC motor, is acquired by the functional module of "field orientation angle computation and correction" in the figure. Functional modules of "Clark transformation", "Park transformation" and "inverse Park transformation" are used to implement coordinate transformation on the current vector and the voltage vector, and equivalently transform the control of an AC component in the A-B-C coordinate system of the AC motor into the control of a DC component in the synchronous rotating d-q coordinate system.

The outer loop of the system is the speed control loop, with the input variable being the speed instruction $\omega_r^*$ and the actual rotational speed $\omega_r$ computed by the "rotational speed computation module"; and after the speed deviation is adjusted by a speed proportional integral (PI) controller, the original value $i_{sqInit}^*$ of the torque current instruction is output. The inner loop of the system is composed of two current control loops that respectively control a field current component $i_{sd}$ and a torque current component $i_{sq}$. The "field current computation" module and the "voltage closed-loop correction" module compute amplitude limits for the field current instruction and the torque current according to an actual rotational speed of the motor and an actual output voltage acquired by the voltage reconstruction module, and then the amplitude limits are input to the "voltage coordination considering current optimized distribution module" together with the original value $i_{sqInit}^*$ of the torque current instruction output by the speed loop. To maximize the torque for output, the field currents and the torque currents during full-speed operation are optimally distributed to generate the instructions $i_{sq}^*$ and $i_{sd}^*$ of the current loop. Then, the current loop adjusts the output voltage in real time according to the current deviation to quickly track the current instruction. In view of the cross counter electromagnetic force (EMF) coupling effect between d and q axes, the "complex vector decoupling current PI controller" is used to implement quick decoupling control on the current. In the voltage modulation portion, the voltage output capability of the inverter is maximized through the functional module of "SVPWM full-range voltage output control", to expand the constant power operating range of the motor, and improve the dynamic performance of the system.

Figure 19:
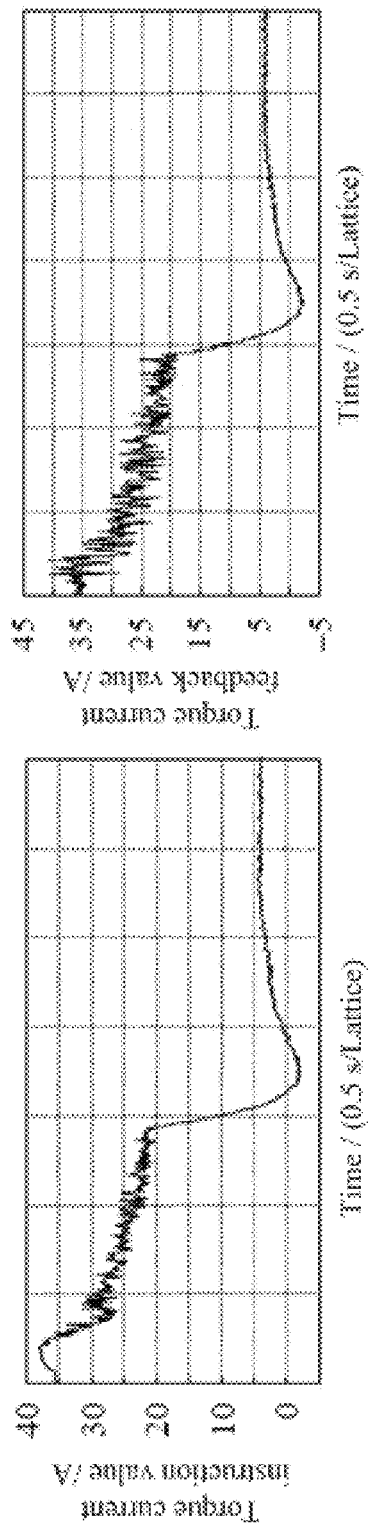
FIG. 19 is a curve graph of a torque current instruction and a feedback instruction.

With the above comprehensive control solutions, the torque current response result shown in FIG. 19 can be obtained. As can be seen, the response for the current instruction is well tracked, to ensure the response characteristic of the motor.

Figure 20:
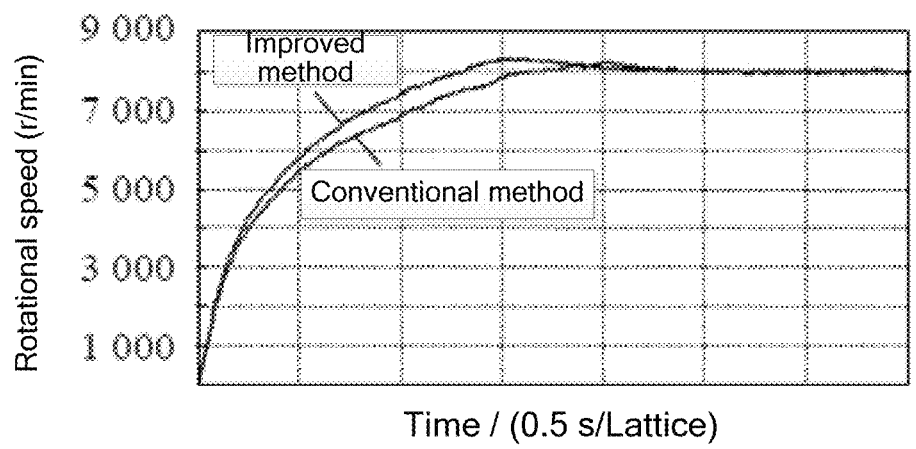
FIG. 20 is a comparison curve graph in start of a spindle before and after algorithm improvement.

The "motor wide-range maximum torque control algorithm based on indirect rotor field orientation" greatly shortens the spindle acceleration and deceleration time. With the asynchronous spindle motor at 7.5 Kw, the rated rotational speed of 1,500 r/min and the maximum rotational speed of 8,000 r/min as an example, when the speed changes within 0-8,000 r/min, the method improved from the conventional "1/$\omega_r$ flux-weakening method" needs 1.8 s, whereas the improved comprehensive spindle high-response control algorithm only needs 1.3 s, as shown in FIG. 20 below.

During 3C metal machining, the spindle typically has a rotational speed of 20,000 r/min. With actual measurement, the improved servo drive may save 0.6 s whenever the spindle accelerates or decelerates. If there is a need to change 10 or more cutters in one procedure, the time of 0.6×2×10=12 s may be saved for each machining, and thus the machining efficiency is greatly improved.

Figure 21A:
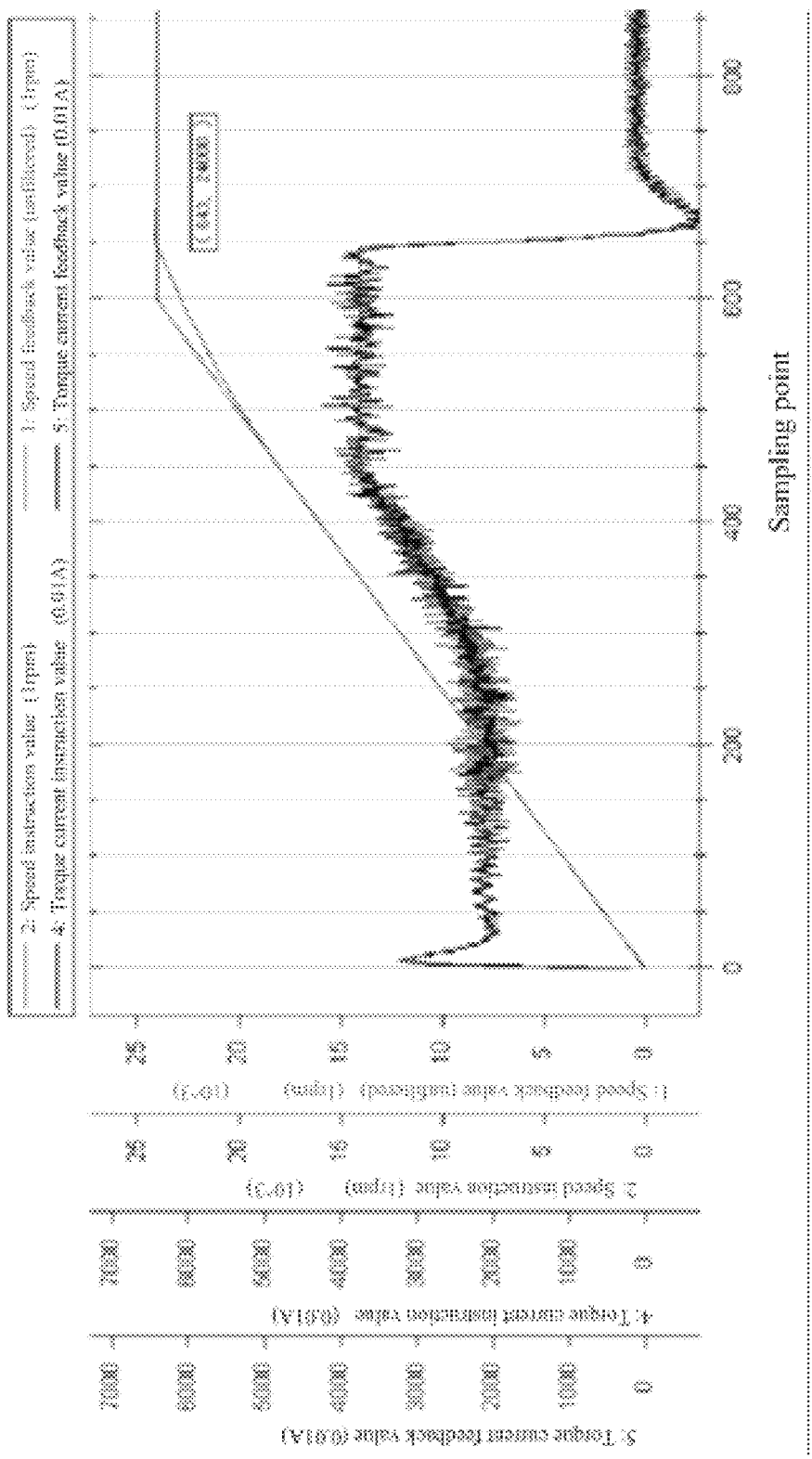
FIG. 21*a* and FIG. 21*b* are curve graphs of a dynamic acceleration and deceleration process of a high-speed spindle motor.
Figure 21B:
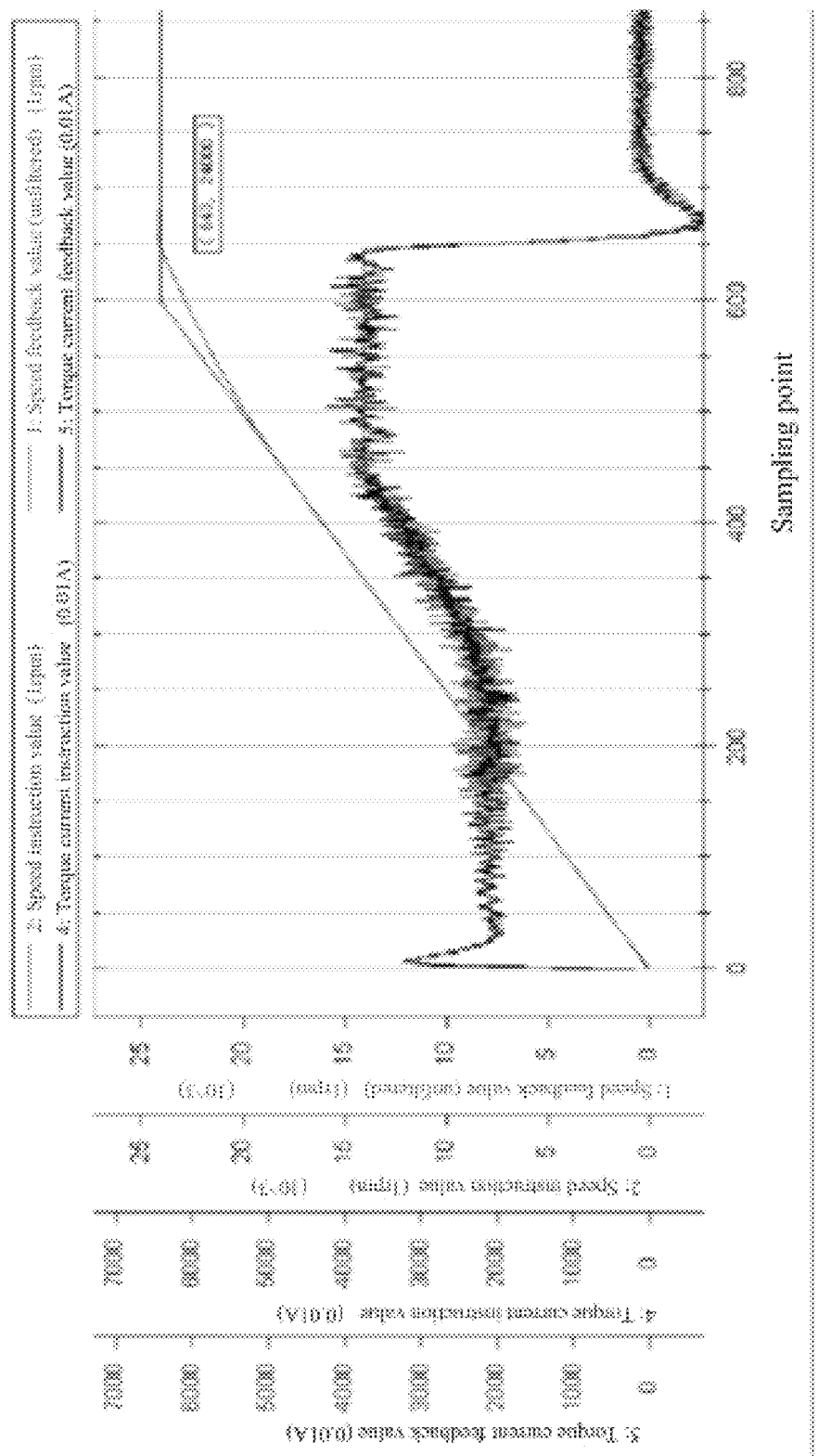
Figure 22:
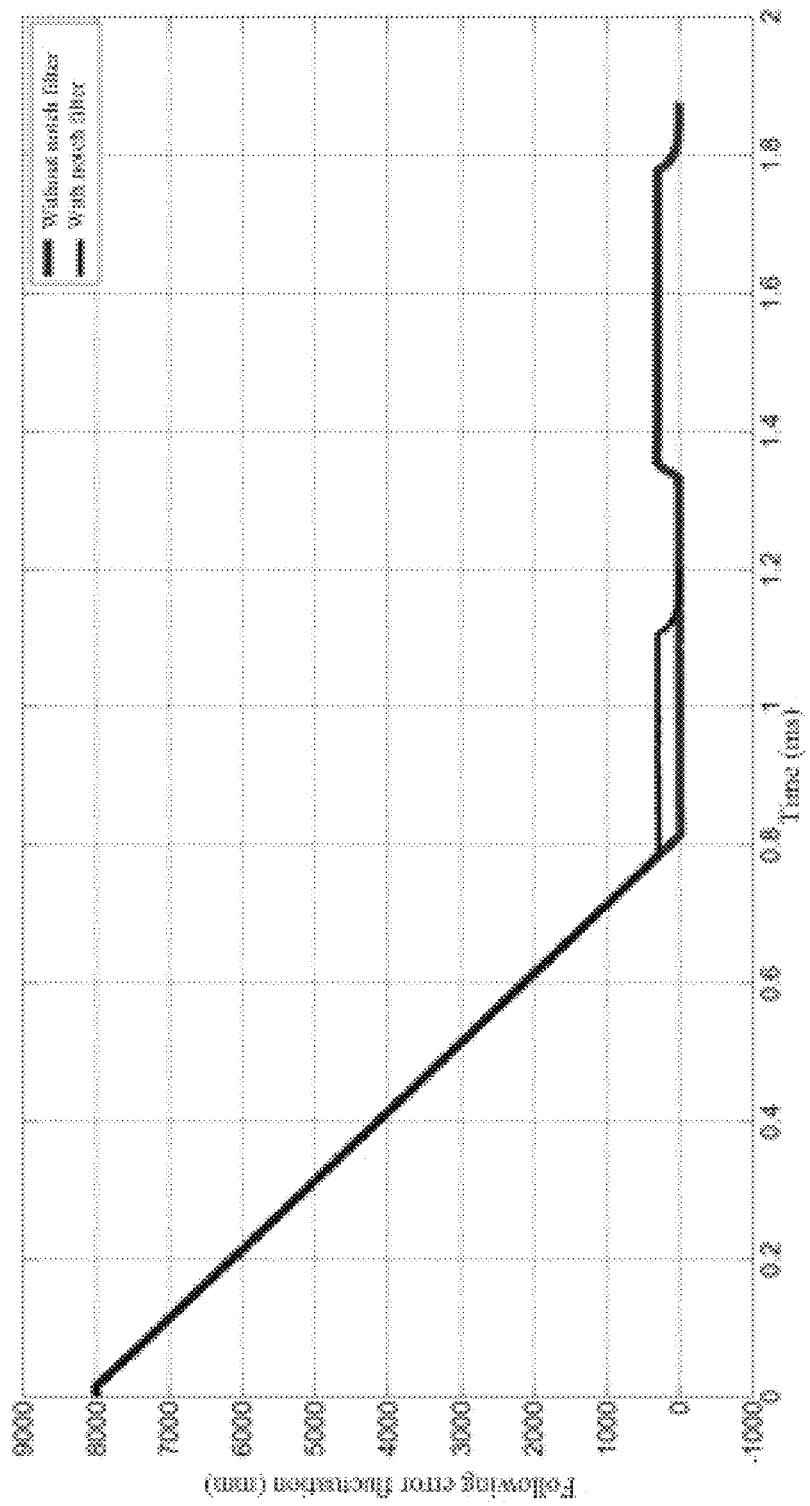
FIG. 22 is a comparison curve graph of a spindle between conventional orientation and orientation in motion.

FIG. 21a and FIG. 21b show a start and brake response result of a spindle motor at 24,000 r/min. The spindle motor takes 1.29 s to accelerate to 24,000 r/min, 300 ms to accelerate to the rated rotational speed of 6,000 r/min, and 990 ms to decelerate to 0 from 24,000 r/min. On the other hand, in rigid tapping and cutter changing functions of the numerical control machine tool, an orientating function of the spindle is necessary. The typical procedure is that the spindle performs orientation first and then performs the tapping and cutter changing. The conventional control logic for the spindle is that the spindle decelerates to zero first and then performs the orientation, as shown in FIG. 22.

In order to meet the requirement of machining the Huazhong 8 series system at the high efficiency, the "orientation in high-speed motion of spindle" is used in the spindle drive control policy. The orientation control on the spindle starts before the spindle decelerates to zero. When the spindle decelerates to the zero, the orientation is completed. Compared with the conventional method, with the "orientation in motion of spindle", the tapping may start after the spindle decelerates to the zero, and there is no need for reorientation, to save the time required by one orientation of the spindle. With the actual measurement, the "high-speed orientation control algorithm" can save 0.5-0.7 s for each tapping. For some machining process in need of frequent rigid tapping, the technology can greatly shorten the single cutting time.

4. Bus High-Speed Multi-Axis Real-Time Synchronization Technologies

The digital control interface of the field bus serves as an essential condition for high-speed and high-accuracy control of the servo driving apparatus. It has been a common practice for foreign manufacturers to integrate the field bus and the industrial Ethernet technology or even the wireless network technology into the servo driver. Presently, the industrial Ethernet interfaces, in cooperation with open communication protocols, have been widely recognized and applied in high-performance drivers. The communication protocols, such as the Fanuc Serial Servo Bus (FSSB), the Drive_CliQ from the Siemens, the SSCNET_III bus from the Mitsubishi, the EtherCAT from the Beckhoff, the PowerLink from the B&R, and the SynqNet from the Danaher, make the multi-axis real-time synchronization control possible, and are also integrated into some high-end servo drivers. In 180U series motor drivers, the NCUC-Bus used is the strong real-time field bus protocol that possesses independent intellectual property rights and is proposed in the Numerical Control Union of China-Bus. In the developed servo driving apparatuses having bus interfaces, the bus interfaces may select RJ45 and optical fibers. While protocol design of the application layer is accomplished in control software, FPGA programs, drives and applications of NCUC-bus slave stations are developed in communication firmware according to the protocol. Different field bus interfaces may also be achieved by developing different field bus interface modules on the hardware platform. The field bus communication protocol may be implemented, provided that corresponding drive programs and firmware are provided for connection with the software platform.

In the bus servo drive system, in order to ensure synchronization of a multi-axis communication system, a distribution clock (DC) is often used to coordinate task instruction reception and instruction update among motion axes. For example, with the provided DC unit, all devices in the network can obtain absolute system time having a tiny phase difference (less than 1 us). Hence, the DC provides the following characteristics for the slave station on each motion axis: clock synchronization between slave stations (as well as between the slave station and the master station), generation of synchronous output signals (SyncSignals), input of accurate timestamps of events (LatchSignals), synchronous interruption, and synchronous output update and input sampling of digital semaphores.

Figure 23:
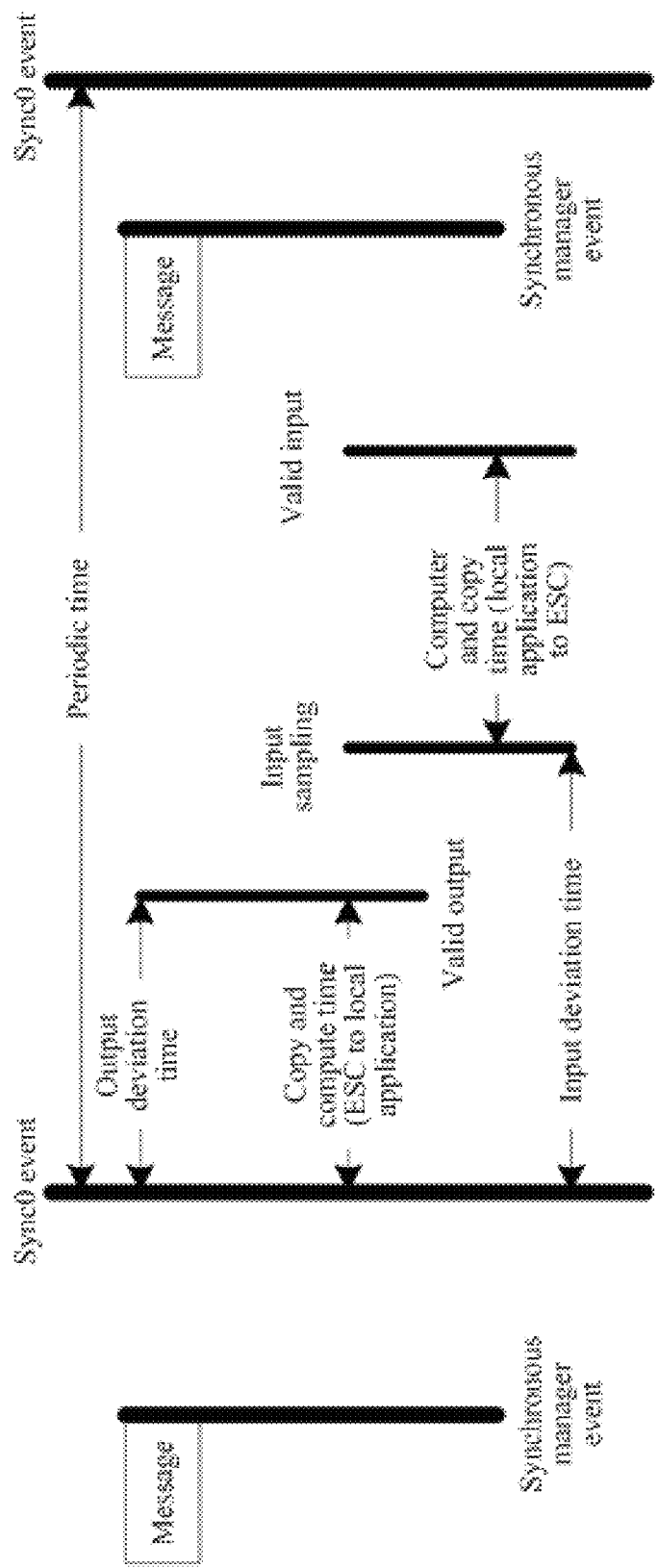
FIG. 23 is a diagram of a synchronous mode of an NCUC DC.

All slave stations supporting the DC are provided with an own local clock. The local clock operates independently after powered on, and has an independent clock source. In order to synchronize clocks of the slave stations, the master station needs to adjust its clock during initialization and operation. Applications of the slave stations are synchronized through a synchronization signal provided by the DC, such that a higher level of synchronization accuracy may be provided. As the jitter may reach a nanosecond level, the synchronization within 1 ms is available. The synchronization mode of the DC used herein is as shown in FIG. 23. As the NCUC bus uses a lumped-frame format, and the instruction and state information of each motion axis are transmitted and received in one data frame, the synchronization data frame event in the master station of the numeric control system may be used to synchronize instructions of the motion axes. Before arrival of the synchronization event, the message containing process data in the master station must be completely processed by NCUC communication firmware in the FPGA, or otherwise, is monitored by the WATCHDOG and viewed as a synchronization error. Moreover, in order to improve the reliability and reduce the complexity of the system, the process data in the synchronization mode is not updated immediately upon arrival (that is, before the synchronization event occurs), and will be processed after the next synchronization event of the DC.

Such a distributed clock processing manner focuses on how to make multiple motion axes synchronously update upon the reception of the motion instruction, without taking the complexity of the clock for the actual servo drive system on the motion axis into considerations. The servo driver actually uses an industrial Ethernet communication interface, and there are typically 3 clocks in operation: a work clock TO of the PWM inverter, a servo control sampling clock Ts, and an Ethernet communication clock Tn. Typically, the three clocks are theoretically in an integer multiple of one another. However, during design of the hardware system, the three clocks are likely to use three clock sources, and offset and drift errors among them are hard to meet the integer-multiple relation, or even "synchronization failure" is caused due to time cumulation, that is, although the instructions are synchronously updated, the position servo control is not synchronous to the instruction update because the instructions do not keep synchronous with the servo control sampling. This will lead to a "jump" of the motion in single-axis operation, and an evident trajectory deviation in multi-axis trajectory motion, thereby affecting the machining size.

In this regard, a bus synchronization algorithm is further developed in the servo drivers. That is, work clocks of PWM inverters on the motion servo axes are synchronized in real time according to data frame information of the NCUC to avoid the cumulated deviation; and then, servo control sampling clocks are controlled in the integer-multiple relation, which not only makes position instructions sent by the bus update synchronously, but also makes sampling and control of a servo feedback state variable synchronous. Therefore, each servo axis of the 8 series numeric control system can be highly synchronized, and the machining process can be accurately reflected on the motion axes. Such a method has less impact on the linkage effect of each servo axis because the synchronization deviation of the clock on each servo axis is basically transparent (that is, the time when the data frame resides at the substation of the motion axis, which is typically 1-2 us), and is compensated easily.

Figure 24:
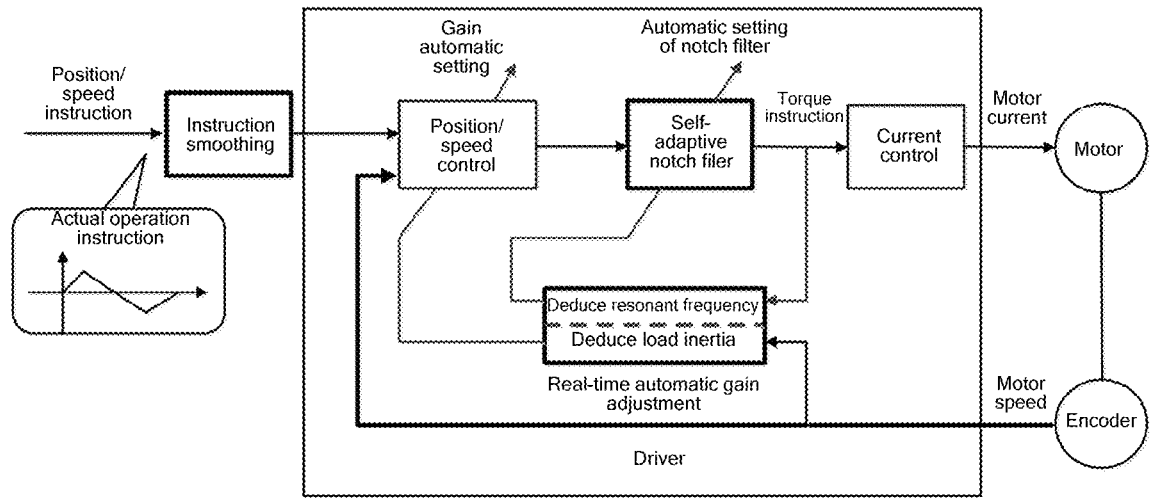
FIG. 24 is a diagram for feature identification and filter characteristic analysis.

Among the high-speed and high-accuracy machining requirements, characteristics of the servo drive system are of the most important conditions. According to analysis on the existing machining process, the high rigidity of the servo system, which is the "high gain" in the control link, serves as the core characteristic. The PI control structure is mainly employed by the servo control of the existing servo system. However, to find a universal and effective PI parameter tuning method is still the challenging research subject. Presently, there are a number of researches on the PI parameter tuning, for example, a dominant pole configuration method, a Ziegler-Nichols engineering tuning method, and an intelligent tuning method. However, these methods present the unsatisfactory control performance, complex analysis and other problems, and are not well applied in engineering practices, because considerations on restrictive conditions on a control object and physical system thereof are insufficient and the performance indicator evaluation conditions used do not reflect the actual condition conveniently in engineering. The PI parameter is the important factor to affect the system performance. Before it is tuned, there is a need to illustrate performance indicators of the system first, that is, design restrictions, for example, for the rotational speed control performance indicator, are illustrated only according to actual system structures, physical parameters and actual restriction conditions. Then, a PI parameter tuning policy that is simple and comprehensible is pushed forward according to the control indicator and the simplified low-order model, and a qualitative analysis is made on influences of the PI parameter on resonance and stability of the system. It can be found from these requirements that the mechanical rotational inertia and the frequency characteristic of an electromechanical transmission system are important system characteristic parameters to affect the servo control performance, and respectively affect the initial gain settings and optimization restrictions of the servo driver. The block diagram of the basic control structure for feature identification and gain tuning of the servo drive system are as shown in FIG. 24.

For the rotational speed control gain of the servo driver, designers often adhere to improving a response speed of the rotational speed loop as much as possible while the system is stable. The stability and response speed of the system may respectively be measured by a phase margin and a closed-loop bandwidth.

a. Closed-Loop Bandwidth

The frequency corresponding to a −3 dB point of the closed-loop amplitude-frequency characteristic of the system is the closed-loop bandwidth value b. The bandwidth is consistent with an open-loop cut-off frequency c (a frequency value corresponding to a zero crossing point (ZCP) of the open-loop amplitude-frequency characteristic). The open-loop cut-off frequency is typically attainable during design of the controller, and thus is often used to characterize the response speed instead of the closed-loop bandwidth.

b. Phase Margin

Upon the completion of identification on the present inertia, the gain of the controller for the rotational speed loop may be tuned. Compared with the current loop and the rotational speed detection link, the rotational speed control has a low response speed. Hence, the closed-loop transfer function of the current loop may be equivalent as a first-order inertia link, and the rotational speed detection link may be equivalent as a proportional link to design parameters of the rotational speed controller.

With initial identification on the rotational inertia, servo control parameters may be preliminarily set, to further optimize, adjust and simplify the operation. Information required in design, operation, adjustment and maintenance of the controller of the servo system may be divided into device type information, device working condition information and operation state information.

1) Device Type Information

The device type information describes specifications of constituent parts of the servo system, including servo motor information such as the resistance, inductance, pole pairs, rated rotational speed and rated current, power level information such as the inverter power supply, continuous output current and maximum instantaneous output current, and encoder information such as the model, type and resolution of the encoder. During debugging of the servo system, there is a need to compute three-loop control parameters according to the device working condition information, and initially configure the servo system. The device type information is typically acquired when a monitoring software of an upper computer is connected to the servo system; and while the servo system is monitored, the real-time update on the device type information turns out to be unnecessary.

2) Device Working Condition Information

The device working condition information describes the overall operation of the servo system, including internal states such as the state of the main circuit, the control mode, the power-on state of the motor and the rotation direction, IO interface states such as the emergency stop input, servo ON input, alarm output and positioning completed output, and control parameters such as three-closed-loop control parameters and output restrictions for each loop. As the device working condition information changes slow, the data update period is long during monitoring of the servo system.

3) Device Operation Information

The monitoring function is intended to acquire operation information in real time that describes the present state of the servo system, for example, a position feedback, a speed feedback, a torque instruction and torque feedback, a three-phase voltage and current feedback, a vibration signal, etc. These control variables or feedback variables change fast and thus need to be quickly sampled during monitoring of the servo system. An appropriate update frequency is selected according to requirements of the device operation information on timeliness of sampling, and an operation state is reasonably provided to acquire execution procedures of the program, thereby reducing the data acquisition delay arising from the program execution.

4) Event-Based Data Recording Method

According to whether the track of the servo system to the instruction is deviated, the operation state may be divided into stable operation, normal tracking, abnormal tracking and a fault.

The state basically keeps stable when the servo system operates stably in the normal state. Compared with these basically unchanged steady-state data, more attentions are typically paid to dynamic data generated during deviation elimination after the servo system detects a deviation. Moments when the servo system generates inconsistent deviations during instruction tracking are called events.

In the debugged servo system, the events only occur at a few of special operation moments; and dynamic data before and after the occurrence of the events only account for a small proportion in monitoring data generated by long-time operation of the servo system. Event detection is conducted during operation of the servo system. With the events as trigger conditions for recording data, a large number of steady-state operation data useless to device debugging and fault detection may be filtered, to greatly reduce the data volume during monitoring.

Based on whether the servo system stops, the events may be divided into fault events and feature events. Upon the occurrence of an event, the operation state of the servo system is acquired. The acquisition objects selected must be able to implement flexible configuration, to meet ever-changing data acquisition requirements of the device debugging staffs; and appropriate acquisition and storage methods are selected according to features of the acquisition objects. According to change characteristics of the acquisition objects during operation of the servo system, there are steady-state data and dynamic data.

(1) Steady-State Data

During operation of the servo system, some operation state or control parameters, such as the control parameters of the three-closed-loop adjuster, the electrical parameters of the motor, the bus voltage of the inverter, and the position servo instruction, keep stable basically or change regularly within a short time after debugged. These steady-state data keep stable basically before and after event moments, and thus are recorded once for all at the moment when the event occurs.

(2) Dynamic Data

Figure 25:
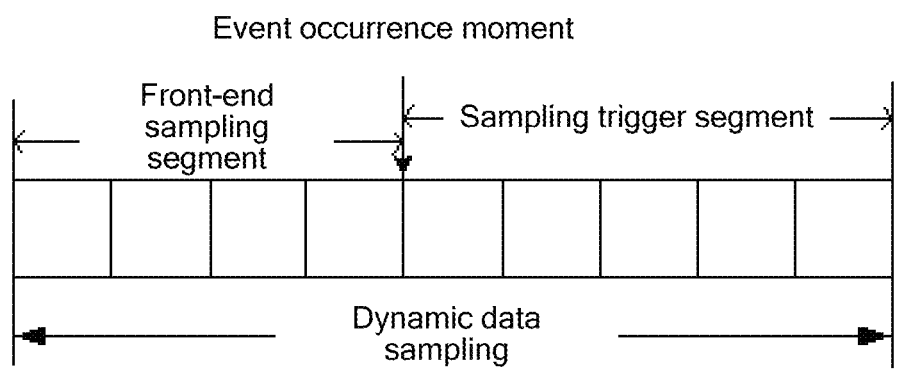
FIG. 25 is a sampling diagram of dynamic data.

Beside the steady-state data recorded once for all, there are also dynamic data that must be recorded continuously. The dynamic data at least meet either of the following two characteristics. The first characteristic is that the change process of the data reflects the dynamic control performance of the servo system, for example, information on the torque current, speed, position and the like of the motor for reflecting the tracking conditions on the torque, speed, and position instruction, and there is a need to record the change of the data before and after the moment when the event occurs. The second characteristic is that frequency-domain characteristics of the data may be analyzed to reflect the operation state of the servo system, for example, the stator current, the axial vibration and the spectrum composition of the rotor speed, and the data acquisition needs to meet the Shannon sampling theorem. In order to meet the two characteristics simultaneously, there is a need to acquire changes of the dynamic data before and after the occurrence of the event, and ensure that the sampling period is constant. With the moment when the event occurs as a reference, the dynamic data are divided into a front-end sampling segment and a sampling trigger segment, as shown in FIG. 25.

Figure 26:
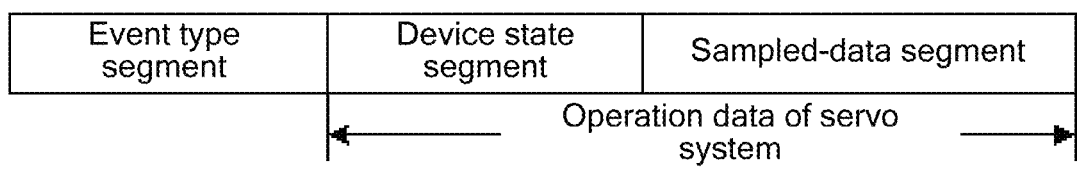
FIG. 26 is a diagram of an event package.

The operation of the servo system is described completely by combining a number of steady-state data and dynamic data. Event-related data contents are stored in the form of an event package. The event package is composed of an event type segment, a device state segment and a sampled-data segment, as shown in FIG. 26. The event type segment includes event time and an event code, and is used to indicate what event occurs at a moment. The device state segment stores the collected steady-state data, and the sampled-data segment stores the collected dynamic data.

5. High-Rigidity Servo Control Using a Number of Filter Combinations

Figure 27:
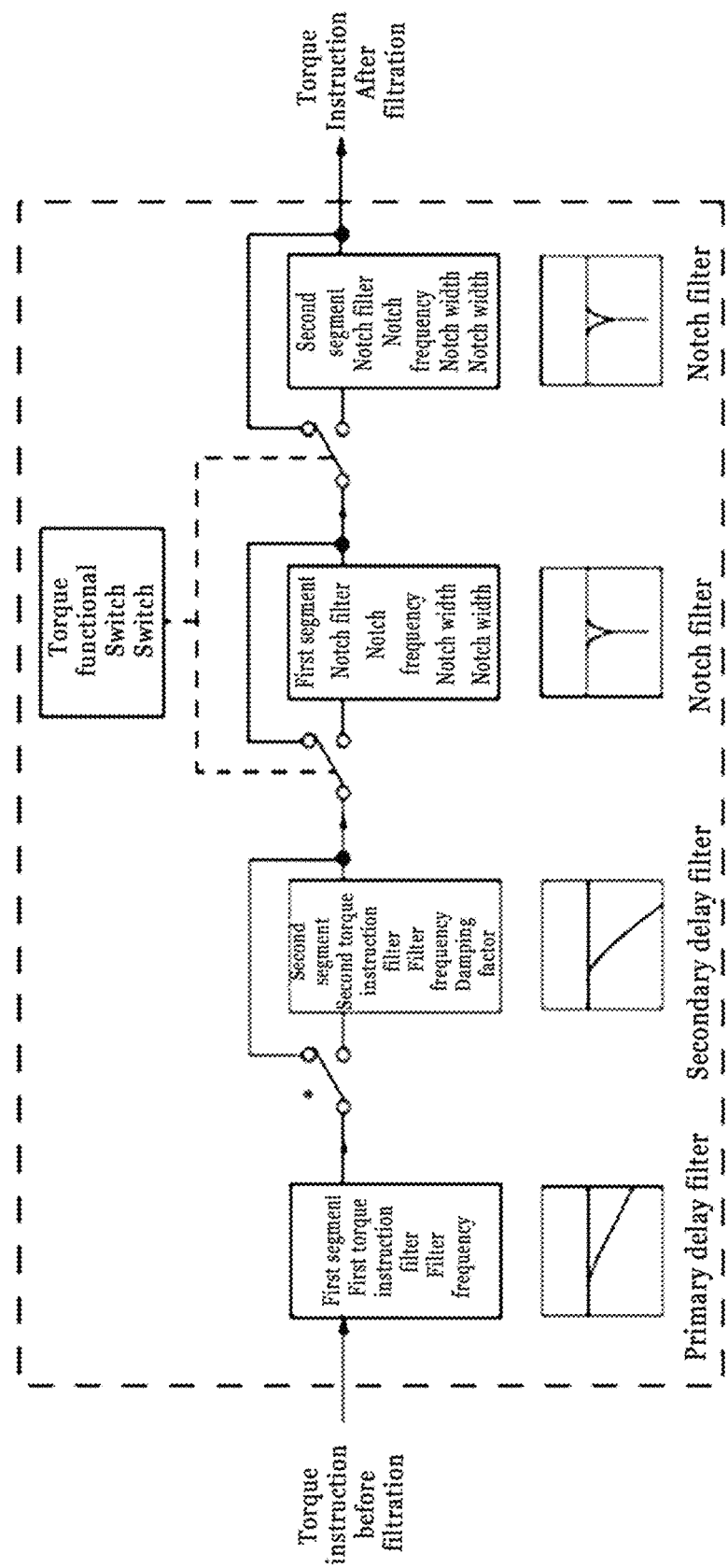
FIG. 27 is a structural view of a torque instruction filter.

With special requirements of the high-accuracy machining on surface finishment, it is inevitable to ensure the response speed of the drive system by improving a gain in the servo control, thereby reducing the tracking error and making an actual path change better reflect the change of the trajectory of the workpiece. However, the nonlinear frequency change arising from a quantization error of the numeric control and the resonance problem of the electro-mechanical transmission system will make such an intention unfulfillable. There is a practical method that designs a number of filter combinations in the torque instruction processing link, to reduce the vibration due to the increased gain, keep the system at a high rigidity, and improve the trajectory processing effect in multi-axis motion. Located behind the speed-loop PI adjuster, the torque instruction filter is a link for smoothing the speed-loop PI output, with the purpose of obtaining the smooth torque, and reducing the torque ripple (a phenomenon posing a threat to operation of the motor). A delay filter and a notch filter are serially configured in the torque instruction filter, as shown in FIG. 27.

Figure 28:
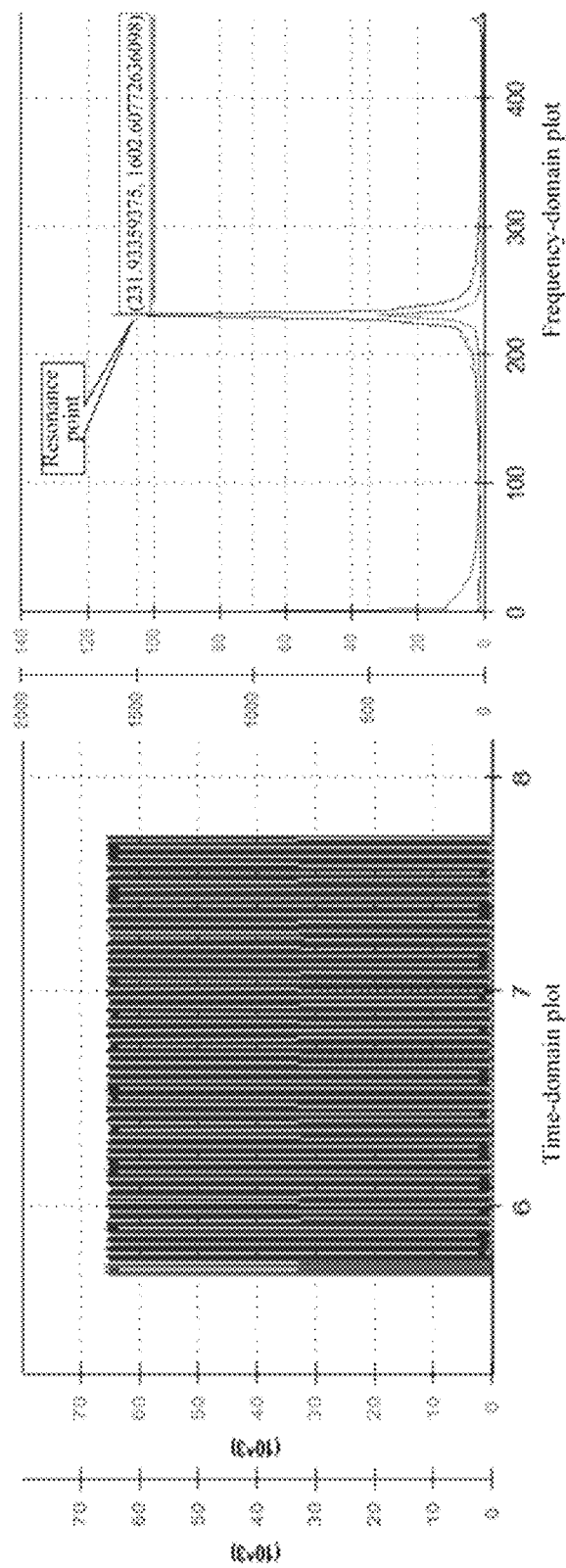
FIG. 28 is a diagram of a resonant frequency obtained by SSTT software.

It is evident that the torque instruction filter is composed of two low pass filters and two notch filters. At present, parameters of the notch filters and parameters of the first-order and second-order low pass filters may be set in debugging support software of the Huazhong 8 series system or servo system. Resonant frequency points may be identified and observed through Service Support Tool Software (SSTT) or servo adjustment software; the current loop instruction signal is acquired at a high speed; and then, the time-domain signal is converted into a frequency-domain signal, to obtain the resonant frequency of the system, that is, the "frequency of the notch filter", as shown in FIG. 28.

Figure 29A:
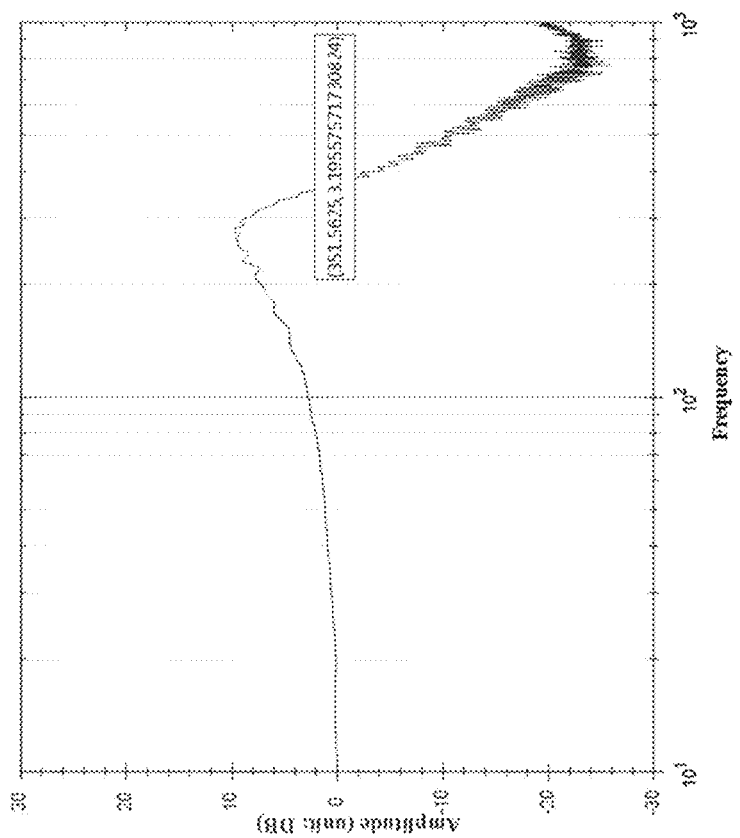
FIG. 29*a* is a speed frequency response (closed-loop bandwidth is 320 Hz) without a filter combination.
Figure 29B:
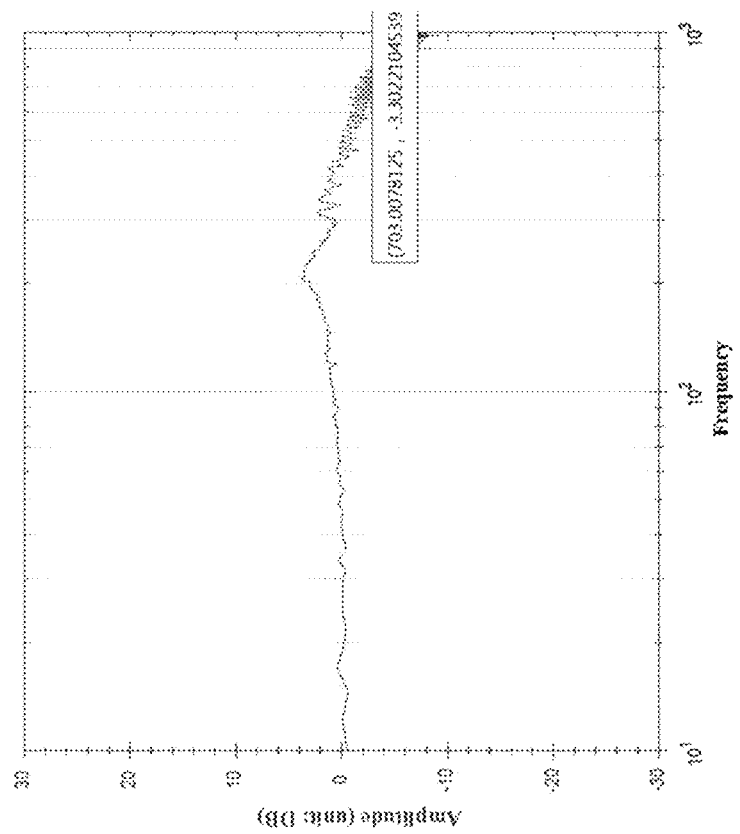
FIG. 29*b* is a speed frequency response (closed-loop bandwidth is 715 Hz) with a filter combination.
Figure 30:
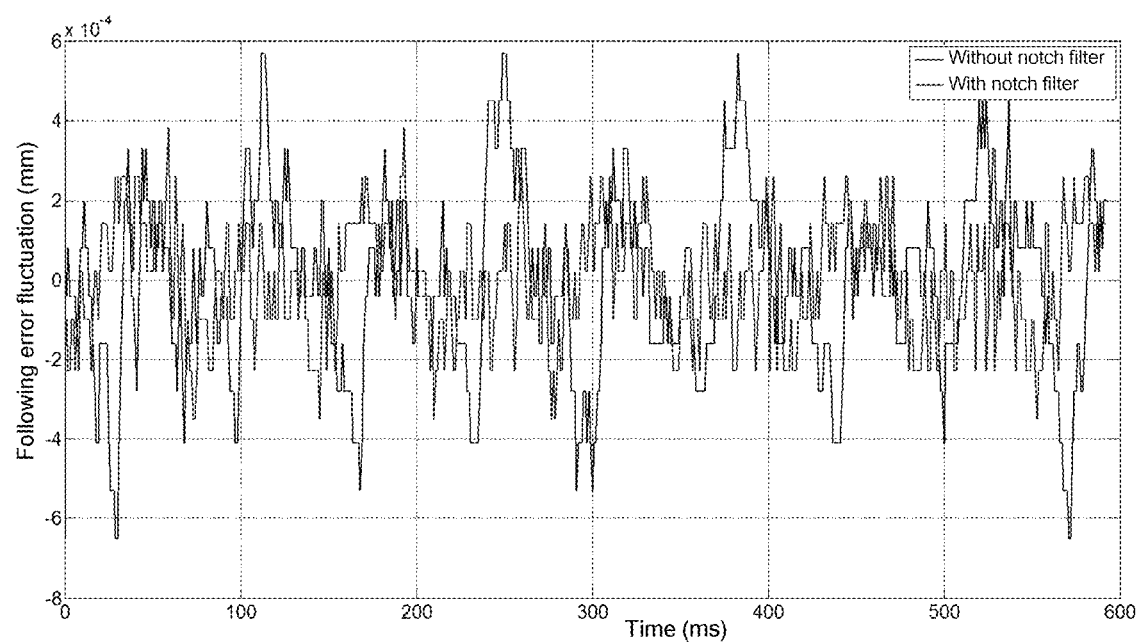
FIG. 30 is a comparison in following error fluctuation before and after use of a notch filter.

Typically, in a case where the notch filter is not provided, the speed loop gain of the servo drive may be adjusted to about 300 Hz (the 1200-1500 interval). After the notch filter is provided, the speed loop gain may be adjusted to 700 Hz (about 2,800) at maximum, and indicators such as the current fluctuation and the tracking error fluctuation are significantly reduced, thereby improving the machining accuracy of the system. FIG. 29 shows a comparison in a closed-loop response of a servo system after parameter identification and gain optimization of a controller. FIG. 30 shows a comparison in tracking error fluctuation of each inclined plane during octahedral machining in an 8 series numeric control system before and after combination of a filter and a notch filter.

6. Sensorless Controllable Rectifier/Inverter Control Adaptive to Working Conditions of Electric Network During high-speed and high-accuracy machining, as the motion servo axis starts and brakes frequently at a high speed, the DC-side voltage of the inverter of the servo driver has a violent change. In order to suppress this change, the common practice is to employ a pump discharge circuit to consume braking energy in an external resistor, which directly results in the following problems. The change of the DC-side voltage will affect the control performance of the driver. Second, due to external consumption of motion energy, the utilization rate of electric energy is not high, and the device has the large power consumption. Third, the large size of the external brake resistor affects installation requirements of the electric cabinet. In view of this, a three-phase controllable rectifier/inverter adaptive to environmental conditions is developed to implement the "green" machining.

The three-phase PWM rectifier has received attentions in many fields because of the low harmonic, high power factor, bi-directional energy feedback, excellent dynamic performance, etc. The PWM rectifier is not cost-effective as it includes the high-capacity electronic power switch (such as an insulated gate bipolar transistor (IGBT) module), the control drive circuit and the current-voltage detection link. The indispensable ways for the PWM rectifier as a replacement of the diode and the transistor for rectification are to reduce the cost and the system complexity, and enhance the reliability. In the servo driver system assorted with the 8 series numeric control system, the three-phase controllable rectifier/inverter is designed. From the perspective without the control of an electric network voltage sensor, a control method adaptive to change conditions of the electric network, a unit power factor control method in bi-directional energy flow and voltage balance of the electric network, and a DC-side voltage balance control method that suppresses a negative sequence current component in voltage unbalance of the electric network and automatically adapts to voltage fluctuation of the electric network are respectively developed.

First of all, with analysis on features of positive and negative sequence voltage components in different coordinate systems during unbalance of the electric network, a method for estimating the positive and negative sequence voltage components of the electric network based on a virtual flux and an electric network voltage is proposed. Influences of the positive and negative sequence voltage components on the power and on voltages and currents on two sides of the rectifier are analyzed; and particularly, a matrix of relations between positive and negative sequence components of the electric network voltage and the AC voltage, and the power during a two-phase stationary coordinate system are deduced. When the control objective is to keep a three-phase current symmetric, a method for compensating the negative sequence component of the electric network voltage in the AC-side voltage and suppressing the negative sequence current of the AC current is proposed. When the control objective is to suppress the DC voltage fluctuation, a method that adjusts the current with a proportional-resonant (PR) adjuster in a two-phase stationary coordinate system such that the electric network inputs an active power without second harmonic is proposed, thereby reducing the fluctuation of the DC voltage.

Figure 31:
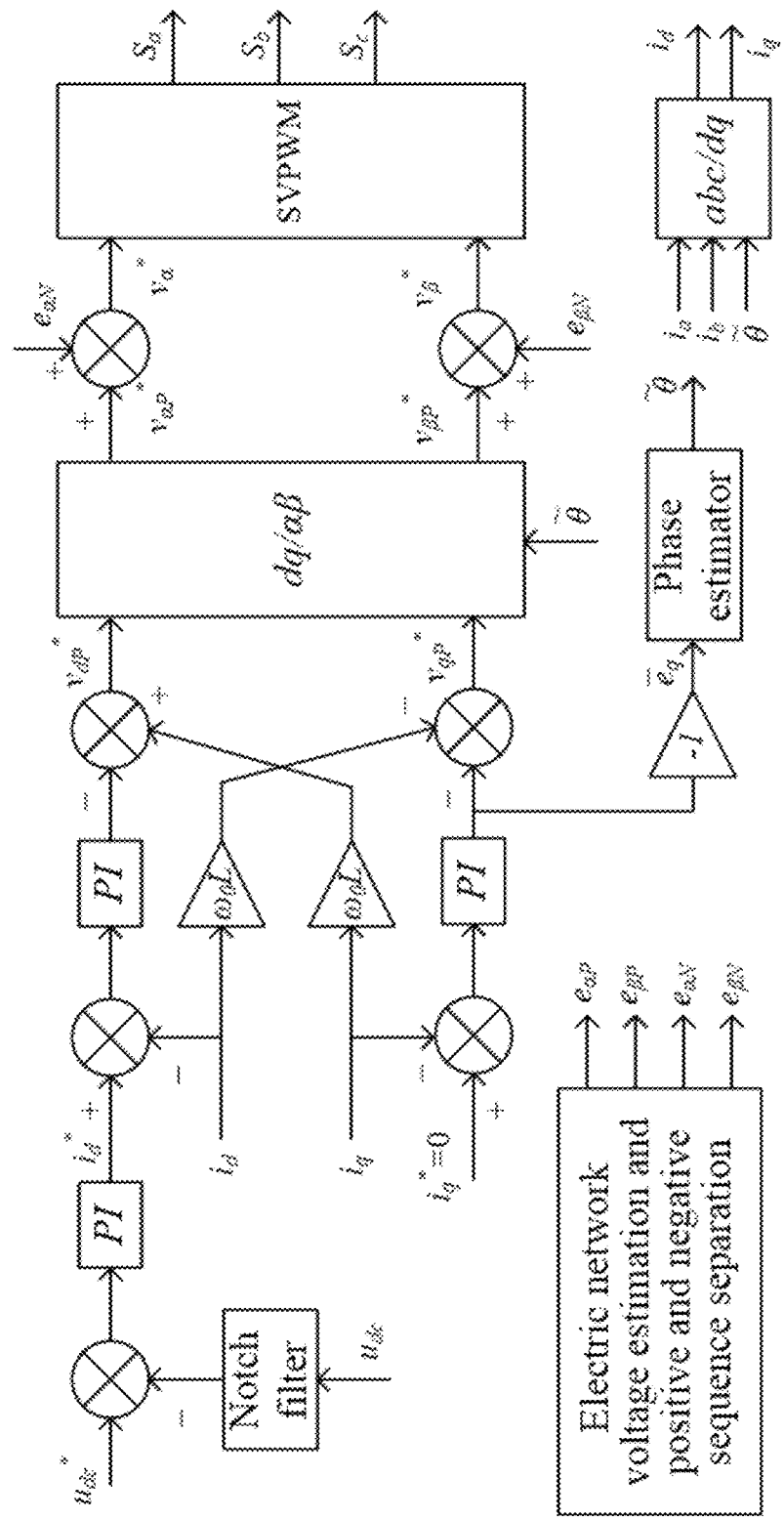
FIG. 31 is a structure of a sensorless controllable rectifier control algorithm in a condition of considering a change of an electric network.

When the three-phase voltage type PWM rectifier (VSR) is not provided with the network voltage sensor, the method for estimating the positive and negative sequence components of the electric network voltage shown in the figure below is used to obtain the negative sequence component of the electric network voltage. In the figure, a negative sequence voltage compensation module and a DC voltage harmonic filtration module are added, to obtain the control algorithm for suppressing the AC negative sequence current during unbalance of the electric network, as shown in FIG. 31.

Next, for large fluctuation of the electric network voltage, an automatic DC voltage balance control algorithm based on reactive injection is designed. A VSR AC-side phase voltage amplitude $V_m$ is calculated with the electric network voltage and the AC-side current, and compared with the DC-side voltage.

Figure 32:
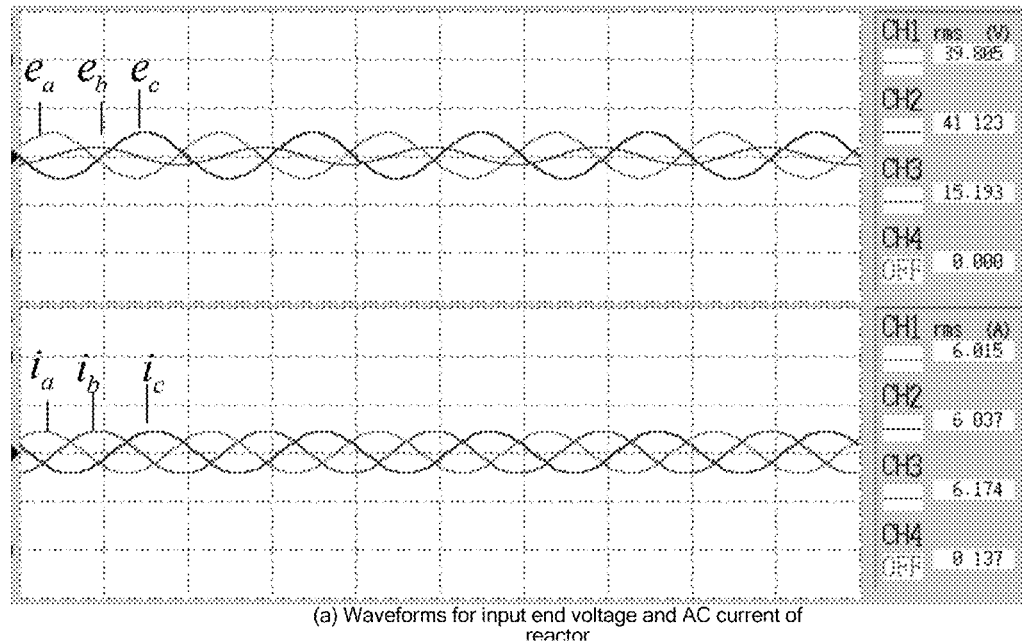
FIG. 32 is a waveform for a voltage and a current of an electric network applying a controllable rectifier/inverter technology.

With the proposed electric network voltage estimator, the control solution for suppressing the negative sequence current, and the adaptive DC voltage balance control solution based on the reactive injection, a power analyzer may be used in a condition of the unit power factor to obtain waveforms for input end voltages and AC currents of a three-phase reactor, as shown in FIG. 32. As can be seen, although the input end voltages of the three-phase reactor are asymmetric, the effective values of the three-phase currents are basically equal, such that the negative sequence component of the current is basically suppressed, and the current presents the desired sine.

Figure 33:
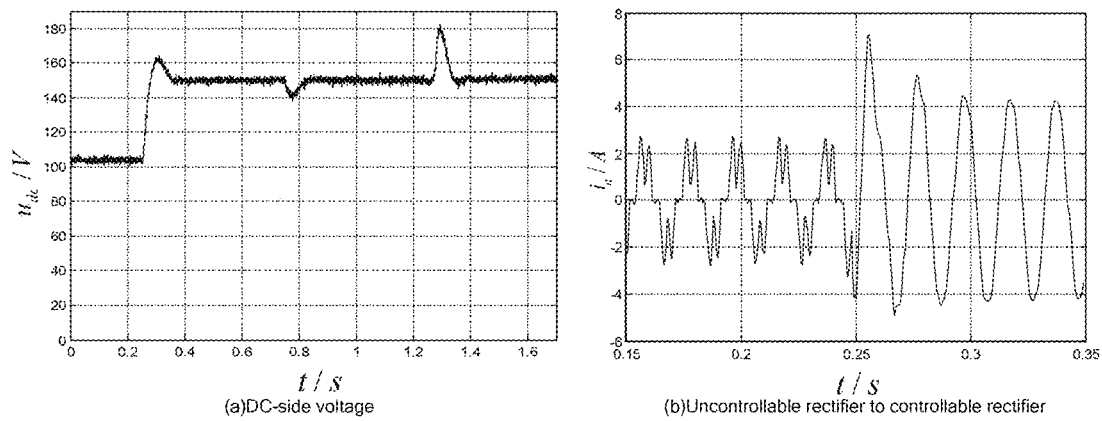
FIG. 33 is a voltage control effect diagram of a controllable rectifier/inverter in different working conditions.

FIG. 33 shows a waveform of a change of a DC-side voltage of a controllable rectifier/inverter during mode handover, motor start and motor brake, and a change of a phase current of an electric network during handover. It can be seen from the dynamic performance of the system control algorithm that the control solution has a desired dynamic response.

Figure 34:
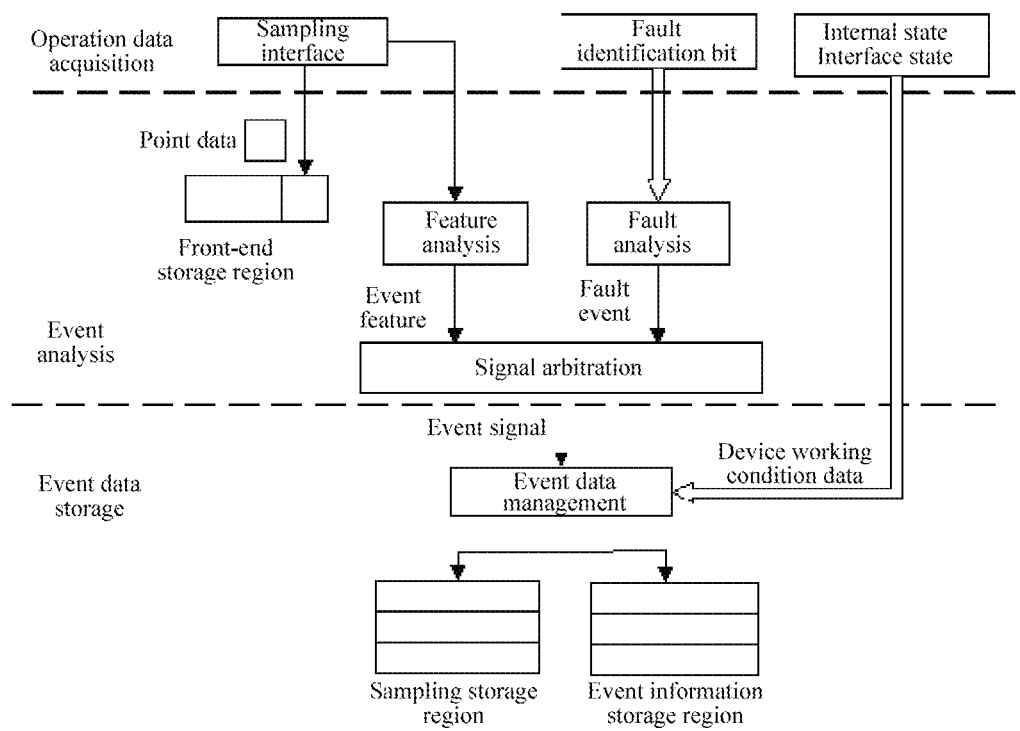
FIG. 34 is an overall structure of a long-range monitoring function.

The overall structure for a long-range monitoring function of the servo system uses an event-based data acquisition method. Event data of a key operation moment is extracted from an operation state of the servo system, which will greatly reduce the data volume during monitoring of the servo system to implement the long-range and long-time monitoring on the servo system. As a whole, the long-range monitoring function is divided into operation data acquisition, event analysis and event data storage, as shown in FIG. 34.

The operation data acquisition part is configured to provide multiple types of operation data of the servo system. With operation time as a reference, the sampling interface encapsulates data sampled from multiple channels at the same moment into point data, and stores the point data to a front-end storage region. The event analysis part acquires analysis data through the sampling interface to analyze a feature event, with a fault event being determined by a fault identification bit of the servo system. The feature event and the fault event send an event signal through an event arbiter to trigger storage of the event data. Upon arrival of the event signal, a device state segment and an event type segment in an event package are first established. As the two segments include the steady-state data, the data are acquired and stored to the event information storage region when the event occurs. The sampled-data segment of the event package is stored in the event sampling storage region, the front-end sampling segment is copied from the front-end storage region, and the sampling trigger segment is filled by the point data acquired by the sampling interface after the event signal is sent.

The above embodiments are merely preferred embodiments provided to more fully illustrate the present disclosure, and the scope of the present disclosure is not limited thereto. Equivalent substitutions or alternations made by those skilled in the art on the basis of the present disclosure are all within the protection scope of the present disclosure. The protection scope of the present disclosure is subject to the claim.

What is claimed is:

1. A worm gear machine comprising a workbench (100) for clamping a worm gear workpiece, a cutter holder (200) for clamping a cutter, a cutter holder adjusting system for adjusting a position of the cutter holder (200) relative to the workbench (100), and a hardware circuit, wherein the cutter holder (200) comprises a bigger bracket (201), a first slide rail (202) is disposed on the bigger bracket (201), a slide seat (203) in sliding fit with the first slide rail (202) is disposed on the first slide rail (202), a second slide rail (204) is disposed on the slide seat (203), a smaller bracket (205) in sliding fit with the second slide rail (204) is disposed on the second slide rail (204), and the first slide rail (202) and the second slide rail (204) are parallel to each other; and a cutter holder spindle (206) is disposed between the bigger bracket (201) and the slide seat (203), a cutter bar (207) synchronously rotating with the cutter holder spindle (206) is disposed between an end of the cutter holder spindle (206) facing toward the smaller bracket (205) and the smaller bracket (205), and a gearbox (208) for driving the cutter holder spindle (206) to rotate is disposed in the bigger bracket (201), wherein the smaller bracket (205) is smaller than the bigger bracket (201); and a first hydrostatic bearing mechanism is disposed between the slide seat (203) and the cutter holder spindle (206), and a second hydrostatic bearing mechanism is disposed between the cutter bar (207) and the smaller bracket (205);

wherein the cutter holder adjusting system comprises: a base (300); an X-direction guide rail (301), and a pedestal (302) in sliding fit with the X-direction guide rail (301) which are arranged on the base (300); a Y-direction guide rail (303) perpendicular to the X-direction guide rail (301), and a cutter holder seat (304) in sliding fit with the Y-direction guide rail (303) which are arranged on the pedestal (302); and a Z-direction guide rail (305) which is disposed on the cutter holder seat (304); wherein the Z-direction guide rail (305) is perpendicular to both the X-direction guide rail (301) and the Y-direction guide rail (303); and wherein the bigger bracket (201) is mounted on the Z-direction guide rail (305) in sliding fit;

wherein the first hydrostatic bearing mechanism comprises a first shaft sleeve (210) sleeved to the cutter holder spindle (206), and a first hydrostatic oil chamber is provided between the first shaft sleeve (210) and the cutter holder spindle (206); and an inner hole of the first shaft sleeve (210) is a conical hole, a conical section fitting with the first shaft sleeve (210) is provided on the cutter holder spindle (206), and the conical hole and the conical section have the same conicity; and a first mounting portion (203a) for mounting the cutter holder spindle (206) is disposed on the slide seat (203), and the first shaft sleeve (210) and a side of the first mounting portion (203a) are in limiting fit and are provided with a first adjusting washer (211) between the first shaft sleeve (210) and a side of the first mounting portion (203a), wherein the first adjusting washer (211) is configured for adjusting a position of the first shaft sleeve (210) along an axial direction of the first shaft sleeve (210) relative to the conical section to adjust a fit clearance between the first shaft sleeve (210) and the conical section;

wherein a positioning plate (212) sleeved to the cutter holder spindle (206) is fixedly mounted on an other side of the first mounting portion (203a), and a first thrust bearing (213) is disposed on one side of the positioning plate (212) and a second thrust bearing (213) is disposed on an opposite side of the positioning plate (212), the first thrust bearing and the second thrust bearing being configured for bearing a force along an axial direction of both the first thrust bearing and the second thrust bearing; and a first shaft shoulder positioned between the conical section and the positioning plate (212) is disposed on the cutter holder spindle (206), a side of the positioning plate (212) away from the first shaft sleeve (210) is provided with a limit sleeve (214) sleeved to the cutter holder spindle (206), and a side of the limit sleeve (214) away from the positioning plate (212) is provided with a spindle nut (215) in threaded fit with the cutter holder spindle (206), wherein one of the thrust bearings (213) is disposed between the positioning plate (212) and the first shaft shoulder, and the other of the thrust bearings (213) is disposed between the positioning plate (212) and the limit sleeve (214); and wherein a sealing mechanism is further disposed on two ends of the first hydrostatic oil chamber; and the sealing mechanism comprises a first sealing ring (216), a sealing sleeve (217) and a second sealing ring (218), the first sealing ring (216) is disposed between the first shaft sleeve (210) and the cutter holder spindle (206), the sealing sleeve (217) is sleeved to the limit sleeve (214), and the second sealing ring (218) is disposed between the sealing sleeve (217) and the limit sleeve (214);

wherein the second hydrostatic bearing mechanism comprises a first sleeve (220) sleeved to the cutter bar (207) in sliding fit and synchronously rotating with the cutter bar (207), a second shaft sleeve (221) is sleeved to the first sleeve (220), and a second hydrostatic oil chamber is provided between the second shaft sleeve (221) and the first sleeve (220); and an outer wall of the second shaft sleeve (221) is a conical surface, a conical through hole fitting with the conical surface is provided on the smaller bracket (205), and the conical surface and the conical through hole have the same conicity; and an expansion seam (222) is provided on the second shaft sleeve (221) along a longitudinal direction of the second shaft sleeve (221), and a clearance adjusting mechanism for adjusting a position of the second shaft sleeve (221) along an axial direction of the second shaft sleeve (221) relative to the conical through hole to adjust a fit clearance between the second shaft sleeve (221) and the first sleeve (220) is disposed on the smaller bracket (205), wherein the clearance adjusting mechanism comprises two cover plates (227), wherein each cover plate of the two cover plates (227) respectively is disposed on a respective one of two sides of the smaller bracket (205), where a clearance adjusting washer (228) is disposed between one of the two cover plates (227) and the second shaft sleeve (221), and an adjusting washer (229) is disposed between the other one of the two cover plates (227) and a sidewall of the smaller bracket (205);

wherein deformation grooves (223) are further annularly and uniformly distributed on an outer sidewall of the second shaft sleeve (221), each of the deformation grooves (223) is arranged along the longitudinal direction of the second shaft sleeve (221), and each of the deformation grooves (223) is provided therein with a metal rubber elastomer (248) for driving the second shaft sleeve (221) to deform adaptively, wherein a cross section of each metal rubber (248) is tapered along the longitudinal direction of the second shaft sleeve (221) towards the clearance adjusting washer (228); and an oil groove (224) is further provided on an inner wall of the second shaft sleeve (221), an oil hole (225) interconnected with an outer wall of the second shaft sleeve (221) is provided in the oil groove (224), and an annular oil groove (226) corresponding to the oil hole (225) is provided on an inner wall of the conical through hole.

2. The worm gear machine according to claim 1, wherein a first rotating shaft (230) parallel to the cutter holder spindle (206) is disposed in the gearbox (208), a first gear (231) and a second gear (232) that respectively and synchronously rotate with the cutter holder spindle (206) are arranged on the cutter holder spindle (206), a third gear (233) is disposed on the first rotating shaft (230) and is engaged with both the first gear (231) and the second gear (232), and a difference in the number of teeth between the first gear (232) and the second gear (231) has an absolute value of 1.

3. The worm gear machine according to claim 2, wherein a transmission gear shaft (234) is sleeved to the cutter holder spindle (206), and both the first gear (231) and the second gear (232) synchronously rotate with the transmission gear shaft (234); and one end of the transmission gear shaft (234) is provided with a connecting disc (235) fixedly connected to the transmission gear shaft (234), the connecting disc (235) comprises at least two lobes, and a flat key (236) fitting with the cutter holder spindle (206) is disposed between two adjacent lobes of the at least two lobes of the connecting disc (235).

4. The worm gear machine according to claim 1, wherein the workbench (100) comprises a housing (101), a workbench body (102) is disposed on the housing (101), a mandrel (103) and a worm and worm gear mechanism for driving the mandrel (103) to rotate are arranged in the housing (101) of the workbench, and the workbench body (102) synchronously rotates with the mandrel (103);

the worm and worm gear mechanism comprises an indexing worm (104) and a damping worm (105) parallel to each other, same ends of the indexing worm (104) and the damping worm (105) are respectively provided with a first engagement gear (106) and a second engagement gear (107) engaged with each other, a transmission ratio of the first engagement gear (106) to the second engagement gear (107) is equal to 1, and the indexing worm (104) and the damping worm (105) have the same helix angle but opposite rotation directions; and a mandrel sleeve (108) synchronously rotating with the mandrel (103) is sleeved to the mandrel (103), an indexing worm gear (109) engaged with the indexing worm (104) and a damping worm gear (110) engaged with the damping worm (105) are arranged on the mandrel sleeve (108), the indexing worm (104) is transmissively connected to a power component, and a micro-motion component is disposed on the damping worm (105), wherein the micro-motion component is configured for driving the damping worm (105) to move along a lengthwise direction of the damping worm to ensure zero-clearance engagement between the damping worm (105) and the damping worm gear (110).

5. The worm gear machine according to claim 4, wherein a first hydrostatic guide rail (111) and a second hydrostatic guide rail (112) are arranged between the housing (101) and the mandrel (103); the first hydrostatic guide rail (111) is coaxial with the mandrel (103) and disposed on an upper end surface of the mandrel (103), and an annular groove (113) for avoiding the first hydrostatic guide rail (111) is provided on an undersurface of the workbench body (102); the second hydrostatic guide rail (112) is coaxial with the mandrel (103) and sleeved to the mandrel (103); and a hydraulic oil passage (114) is provided in the housing (101), wherein the hydraulic oil passage (114) is configured for providing hydraulic oil between the first hydrostatic guide rail (111) and a fitting surface of the mandrel (103) as well as between the second hydrostatic guide rail (112) and the fitting surface of the mandrel (103), the hydraulic oil forming a hydraulic oil film.

* * * * *